US009291713B2

(12) United States Patent
Shaw et al.

(10) Patent No.: US 9,291,713 B2
(45) Date of Patent: Mar. 22, 2016

(54) PROVIDING REAL-TIME SEGMENT PERFORMANCE INFORMATION

(75) Inventors: Mark Shaw, San Francisco, CA (US); Davis Kitchel, Norwich, VT (US)

(73) Assignee: Strava, Inc., San Francisco, CA (US)

(*) Notice: Subject to any disclaimer, the term of this patent is extended or adjusted under 35 U.S.C. 154(b) by 0 days.

(21) Appl. No.: 13/434,435

(22) Filed: Mar. 29, 2012

(65) Prior Publication Data
US 2012/0253488 A1 Oct. 4, 2012

Related U.S. Application Data

(60) Provisional application No. 61/470,238, filed on Mar. 31, 2011.

(51) Int. Cl.
*G01S 19/19* (2010.01)
*G06Q 10/06* (2012.01)
*G06Q 10/04* (2012.01)

(52) U.S. Cl.
CPC ............... *G01S 19/19* (2013.01); *G06Q 10/04* (2013.01); *G06Q 10/06* (2013.01); *G06Q 10/0639* (2013.01)

(58) Field of Classification Search
CPC .................................................. G01S 5/0045
USPC ................................ 463/39–42; 482/8; 700/91
See application file for complete search history.

(56) References Cited

U.S. PATENT DOCUMENTS

| 5,552,990 | A | 9/1996 | Ihara et al. |
| 6,366,927 | B1 | 4/2002 | Meek et al. |
| 6,453,235 | B1 | 9/2002 | Endo et al. |
| 6,853,917 | B2 | 2/2005 | Miwa |
| 7,080,065 | B1 | 7/2006 | Kothuri et al. |
| 7,662,064 | B2 | 2/2010 | Lee et al. |
| 7,756,639 | B2 | 7/2010 | Colley et al. |
| 7,828,697 | B1 | 11/2010 | Oberrieder et al. |
| 7,901,292 | B1 | 3/2011 | Uhlir et al. |
| 7,931,562 | B2 | 4/2011 | Ellis et al. |
| 7,953,549 | B2 | 5/2011 | Graham et al. |
| 8,108,139 | B1 | 1/2012 | Pylant |
| 8,112,251 | B2 | 2/2012 | Case et al. |
| 8,121,785 | B2 | 2/2012 | Swisher et al. |
| 8,271,497 | B2 | 9/2012 | Ikenoue |
| 8,326,532 | B2 | 12/2012 | Kmiecik et al. |

(Continued)

FOREIGN PATENT DOCUMENTS

WO 2008105651 9/2008

OTHER PUBLICATIONS

Author Unknown, RouteBoxer Documentation: Examples, downloaded from http://google-maps-utility-library-v3.googlecode.com/svn/trunk/routeboxer/docs/examples.html, document date Mar. 7, 2011 (Example 1).

(Continued)

*Primary Examiner* — Paul A D'Agostino
*Assistant Examiner* — Ankit Doshi
(74) *Attorney, Agent, or Firm* — Van Pelt, Yi & James LLP

(57) ABSTRACT

Providing real-time segment performance information is disclosed. In some embodiments, a segment associated with a user's current activity is determined based at least in part on at least a portion of location information recorded so far. In some embodiments, real-time segment performance information associated with the user's current activity on the segment is communicated.

31 Claims, 30 Drawing Sheets

(56) References Cited

U.S. PATENT DOCUMENTS

| | | |
|---|---|---|
| 2001/0027373 A1 | 10/2001 | Bates et al. |
| 2005/0033515 A1 | 2/2005 | Bozzone |
| 2005/0137871 A1 | 6/2005 | Capman et al. |
| 2005/0250458 A1 | 11/2005 | Graham et al. |
| 2005/0288154 A1 | 12/2005 | Lee et al. |
| 2007/0208469 A1 | 9/2007 | Wille et al. |
| 2007/0271036 A1 | 11/2007 | Atarashi |
| 2007/0288157 A1 | 12/2007 | Peterman |
| 2008/0033633 A1 | 2/2008 | Akiyoshi et al. |
| 2008/0082254 A1 | 4/2008 | Huhtala et al. |
| 2008/0096726 A1* | 4/2008 | Riley et al. .................. 482/8 |
| 2008/0262717 A1 | 10/2008 | Ettinger |
| 2008/0262721 A1 | 10/2008 | Guo et al. |
| 2009/0043495 A1 | 2/2009 | Hattori et al. |
| 2009/0070035 A1 | 3/2009 | Van Buer |
| 2009/0088962 A1 | 4/2009 | Jones |
| 2009/0204597 A1 | 8/2009 | Mani et al. |
| 2009/0326809 A1 | 12/2009 | Colley et al. |
| 2010/0042427 A1 | 2/2010 | Graham et al. |
| 2010/0062817 A1 | 3/2010 | Seydoux |
| 2010/0062905 A1 | 3/2010 | Rottler et al. |
| 2010/0063904 A1 | 3/2010 | Ronen et al. |
| 2010/0088023 A1* | 4/2010 | Werner .................. 701/206 |
| 2010/0099437 A1* | 4/2010 | Moerdijk .................. 455/457 |
| 2010/0131184 A1 | 5/2010 | Stanton |
| 2010/0153348 A1 | 6/2010 | Perczynski et al. |
| 2010/0185386 A1 | 7/2010 | Hess |
| 2010/0210421 A1 | 8/2010 | Case et al. |
| 2010/0279825 A1* | 11/2010 | Riley et al. .................. 482/8 |
| 2011/0003665 A1 | 1/2011 | Burton et al. |
| 2011/0032105 A1 | 2/2011 | Hoffman et al. |
| 2011/0137546 A1 | 6/2011 | Roesser et al. |
| 2011/0208429 A1 | 8/2011 | Zheng et al. |
| 2011/0243431 A1 | 10/2011 | Sangappa et al. |
| 2011/0289031 A1 | 11/2011 | Zheng et al. |
| 2011/0307165 A1 | 12/2011 | Hiestermann et al. |
| 2011/0320156 A1 | 12/2011 | Oohashi et al. |
| 2012/0004845 A1 | 1/2012 | Kmiecik et al. |
| 2012/0028761 A1 | 2/2012 | Dorogusker et al. |
| 2012/0095578 A1 | 4/2012 | Tchao et al. |
| 2012/0158668 A1 | 6/2012 | Tu et al. |
| 2012/0209518 A1 | 8/2012 | Nowak et al. |
| 2012/0265432 A1 | 10/2012 | Ashby |
| 2013/0006925 A1 | 1/2013 | Sawai et al. |
| 2013/0031049 A1 | 1/2013 | Watanabe et al. |
| 2013/0166049 A1 | 6/2013 | Werner et al. |
| 2014/0058661 A1 | 2/2014 | Choi et al. |
| 2014/0350850 A1 | 11/2014 | Kmiecik et al. |

OTHER PUBLICATIONS

Author Unknown, RouteBoxer Documentation: Examples, downloaded from http://google-maps-utility-library-v3.googlecode.com/svn/trunk/routeboxer/docs/examples.html, document date Mar. 7, 2011, downloaded Aug. 2, 2011,(Example 2).

Author Unknown, RouteBoxer Documentation: Examples, downloaded from http://google-maps-utility-library-v3.googlecode.com/svn/trunk/routeboxer/docs/examples.html, document date Mar. 7, 2011, downloaded Aug. 2, 2011,(Example 3).

Author Unknown, RouteBoxer Documentation: Examples, downloaded from http://google-maps-utility-library-v3.googlecode.com/svn/trunk/routeboxer/docs/examples.html, document date Mar. 7, 2011, downloaded Aug. 2, 2011,(Example 4).

Author Unknown, RouteBoxer Documentation: Examples, downloaded from http://google-maps-utility-library-v3.googlecode.com/svn/trunk/routeboxer/docs/examples.html, document date Mar. 7, 2011, downloaded Aug. 2, 2011,(Example 5).

Author Unknown, RouteBoxer Documentation: Examples, downloaded from http://google-maps-utility-library-v3.googlecode.com/svn/trunk/routeboxer/docs/examples.html, document date Mar. 7, 2011, downloaded Aug. 2, 2011,(Example 6).

Author Unknown, RouteBoxer Documentation: Examples, downloaded from http://google-maps-utility-library-v3.googlecode.com/svn/trunk/routeboxer/docs/examples.html, document date Mar. 7, 2011, downloaded Aug. 2, 2011,(Example 7).

Author Unknown, RouteBoxer Documentation: Examples, downloaded from http://google-maps-utility-library-v3 googlecode.com/svn/trunk/routeboxer/docs/examples.html, document date Mar. 7, 2011, downloaded Aug. 2, 2011,(Example 8).

Author Unknown, RouteBoxer Documentation: Examples, downloaded from http://google-maps-utility-library-v3.googlecode.com/svn/trunk/routeboxer/docs/examples.html, document date Mar. 7, 2011, downloaded Aug. 2, 2011,(Example 9).

Author Unknown, RouteBoxer Documentation: Examples, downloaded from http://google-maps-utility-library-v3.googlecode.com/svn/trunk/routeboxer/docs/examples.html, document date Mar. 7, 2011, downloaded Aug. 2, 2011,(Example 10).

* cited by examiner

| Effort ID | GPS information | User ID | Date | Speed | Heart rate | Power | Time |
|---|---|---|---|---|---|---|---|
| 1 | E1(P1, P2, P3 ...Px) | A | 1/29/2011 | 20.6 | 170 | 340 | 3:10 |
| 2 | E2(P1, P2, P3 ... Py) | B | 1/3/2011 | 24.7 | 184 | 330 | 2:56 |
| 3 | E3(P1, P2, P3 ... Pz) | C | 12/4/2010 | 18.2 | 165 | 320 | 1:02 |

Latest Rides

| Name | Date | MPH | HR | Watts | Time |
|---|---|---|---|---|---|
| User 1 | Sat, Mar 27, 2010 | 11.9 | - | 172 | 27:27 |
| User 2 | Sun, Mar 21, 2010 | 18.4 | 152 | 160 | 17:50 |
| User 3 | Sat, Mar 20, 2010 | 16.4 | 147 | 135 | 19:56 |
| User 4 | Sat, Mar 20, 2010 | 16.7 | 129 | 121 | 19:36 |
| User 5 | Fri, Mar 19, 2010 | 16.3 | - | 341 (pm) | 20:05 |

Click Here to See All the Rides on this Segment.

Segment Leaders

| Rank | Name | Date | MPH | HR | Watts | Time |
|---|---|---|---|---|---|---|
| 1 | User 45 | Tue, May 06, 2008 | 24.3 | - | - | 13:27 |
| 2 | User 24 | Wed, Jul 15, 2009 | 22.2 | 169 | 254 | 14:43 |
| 3 | User 3 | Sat, Jun 20, 2009 | 22.0 | 138 | 228 | 14:54 |
| 4 | User 43 | Mon, Oct 19, 2009 | 21.4 | 168 | 203 | 15:16 |
| 5 | User 15 | Mon, Oct 19, 2009 | 21.2 | - | 249 | 15:27 |

Click Here to See the Full KOM Leaderboard for this Segment.

Segment Leader History

| Rank | Name | Date | MPH | HR | Watts | Time |
|---|---|---|---|---|---|---|
| 1 | User 5 | Tue, May 06, 2008 | 24.3 | - | - | 13:27 |

1402 (Latest Rides section)
1404 (Segment Leaders section)

FIG. 14

PROVIDING REAL-TIME SEGMENT PERFORMANCE INFORMATION

CROSS REFERENCE TO OTHER APPLICATIONS

This application claims priority to U.S. Provisional Patent Application No. 61/470,238 entitled MOBILE GLOBAL POSITIONING SYSTEM (GPS) DEVICE FOR PROVIDING REAL-TIME FEEDBACK filed Mar. 31, 2011 which is incorporated herein by reference for all purposes.

BACKGROUND OF THE INVENTION

Traditionally, a GPS device can record and store an athlete's GPS location and other data points (e.g., elevation, heart rate) during his or her physical activity (e.g., running, biking) and the GPS device may be capable of uploading these data points to a remote server at increments during the performance of such physical activity.

BRIEF DESCRIPTION OF THE DRAWINGS

Various embodiments of the invention are disclosed in the following detailed description and the accompanying drawings.

FIG. 2B is a diagram showing an example of efforts stored in a table at the efforts database in accordance with some embodiments.

FIG. 14 is a diagram showing an example of a display of analyzed data for matched efforts in accordance with some embodiments.

DETAILED DESCRIPTION

Figure 1:
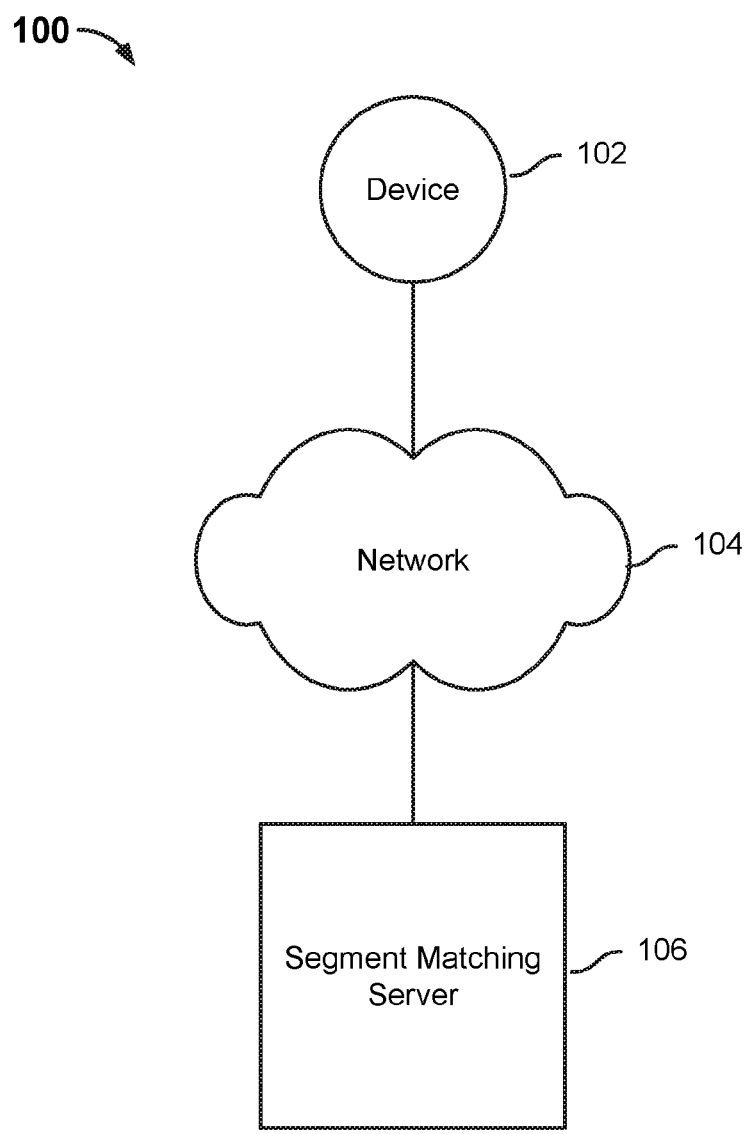
FIG. 1 is a system for defining and matching segments in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Defining segments and matching efforts to segments are disclosed herein. As used herein, a segment refers to a geographical track that is of interest and can be used as a reference (e.g., for comparison of athletic performance along that track and/or for other applications). For example, a segment can be used to identify a popular hill climb for cyclists. As used herein, an effort refers to a recorded series of GPS information with timestamps (e.g., which can represent an instance of athletic performance). In some embodiments, an effort is stored with associated data (e.g., metrics of the activity with which the effort is associated). In some embodiments, one or more segments are derived from a stored effort. In some embodiments, a user can define a segment. In some embodiments, a visual representation of an effort is presented at a user interface and a user defines a segment using the visual representation. In some embodiments, a map is presented at a user interface and a user defines a segment by indicating a track on the map. In various embodiments, a series of GPS information is converted into a set of geographical abstractions prior to storing it as a segment. In some embodiments, a segment is stored with the associated data of efforts that have been determined to match the segment.

In various embodiments, an effort is matched against stored segments. In various embodiments, two levels of matching can be performed using the effort and the stored segments. In the first level of matching, if a percentage of match of the effort to one of the stored segments exceeds a first threshold, then a first determination is made (e.g., the effort is a loose match to the segment). In the second level of matching, if a percentage of match of the effort to one of the stored segments exceeds a second threshold (that is greater than the first threshold), and in addition, the effort also crosses the start and finish lines associated with the segment (or if the segment forms a loop and it is determined that the effort crosses its entry point at the loop segment for a second time), then a second determination is made (e.g., the effort is a tight match to the segment). In some embodiments, it can be determined that an effort is a loose match to one or more stored segments and the effort is also a tight match to one or more stored segments. In some embodiments, if an effort matches (e.g., either as a loose or tight match) to a segment, the associated data of the effort is compared against the associated data stored with the matched segment. In some embodiments, if an effort matches to a segment, the associated data of the effort is also compared against the associated data of other efforts that match the segment.

FIG. 1 is a system for defining and matching segments in accordance with some embodiments. System 100 includes device 102, network 104, and segment matching server 106. Network 104 includes various high-speed data networks and/or telecommunications networks. Device 102 communicates to segment matching server 106 through network 104. In some embodiments, system 100 may include more or fewer components than what is shown in the example of FIG. 1.

Device 102 is a device that can record GPS information and/or other data associated with a physical activity. Device 102 can also be a device to which GPS information and/or other data associated with a physical activity can be uploaded or transferred. Examples of device 102 includes, but is not limited to: a GPS device (e.g., Garmin Forerunner and Edge devices, including Garmin Forerunner 110, 205, 301, 305, 310XT, 405, 405CX, and Garmin Edge 305, 605, 705, 500), a mobile phone, such as a smart phone (e.g., an Android based device or Apple iPhone device) including a GPS recording application (e.g., MotionX, Endomondo, and RunKeeper), a computer, a tablet device, and/or other general purpose computing devices and/or specialized computing devices, which typically include a general processor, a memory or other storage component(s), a network or input/out (I/O) capability, and possibly integrated GPS functionality or support or an interface for a GPS device or GPS functionality.

In various embodiments, device 102 (or an application thereof) is configured to record GPS information and data associated with a physical activity during the activity. In some embodiments, device 102 is configured to receive recorded GPS information and data associated with a physical activity subsequent to the completion of the activity (e.g., such information is uploaded to device 102). In some embodiments, the recorded GPS information and the associated data is referred to as an "effort." Put another way, an effort is an instance of a physical activity and can be represented through its geographical information as well as other metrics related to athletic performance. Examples of a physical activity include cycling, running, and skiing. In some embodiments, GPS information includes a series of consecutive and discrete GPS data points (e.g., longitudinal and latitude coordinates) with a timestamp for each point. In some embodiments, associated data includes, but is not limited to, elevation, heart rate, power/watts (e.g., energy expended), time, speed (e.g., average and/or maximum speed per segment and/or route, in which average speed, for example, can be derived from time and GPS information), and/or cadence. Associated data can be recorded at various granularities. For example, associated data can correspond to each GPS data point, the entire activity (e.g., the associated data includes averages of the metrics), or portions of the activity. As an example, one can use device 102 on a bike ride. At the end of the bike ride, the user can review his performance with the recorded GPS information (e.g., through a user interface of device 102) to observe the geographical track that he traversed, how much he energy he expended along the ride, how fast he finished it in, average speed, elevation based metrics, and/or other metrics. In some embodiments, device 102 is configured to store the recorded GPS information and the associated data (e.g., effort) and/or send the effort information to server 106. In some embodiments, device 102 is configured to present an interactive user interface. The user interface may display GPS information and receive selections (e.g., made by a user) with respect to the displays. In some embodiments, device 102 sends the selections that it receives to segment matching server 106.

In various embodiments, segment matching server 106 is configured to support and present a user interface at device 102. In some embodiments, segment matching server 106 is configured to receive a user defined segment at the user interface using a recorded effort. A segment refers to a geographical track that is of interest and can be used as a reference for comparisons of athletic performance along that geographical track. Segment matching server 106 is configured to receive a series of GPS information and associated data (e.g., effort). In some embodiments, segment matching server 106 is configured to display a visual representation of the GPS information at the user interface using a map software application. The visual representation can be, for example, a series of flags or a continuous line marked on a graphical map. In some embodiments, segment matching server 106 is able to support a map at the user interface by including logic configured to interact with the Application Programming Interface (API) of a map software/application (e.g., Google Maps, MapQuest, Bing maps, and/or another mapping application/service). In some embodiments, a user may define a segment using the visual representation of the GPS information. In some embodiments, a start point and a finish (e.g., end) point along the visual representation of the GPS information are selected on the graphical map to define a segment. For example, a user may select (e.g., by dropping a marker or clicking) the start and/or finish points along the geographical track that he or she just traversed during a physical activity. The portion of the geographical track between the selected start and finish points is thus defined as a segment. In some embodiments, the start and finish points are stored with the defined segment. In some embodiments, the portion of the geographical track between the selected start and finish points are converted into an abstracted form and then stored in a database for storing segments. In some embodiments, the associated data that correspond to the defined segment is also stored with the segment at the database.

In some embodiments, segment matching server 106 is configured to receive a user defined segment at the user interface using selections on a map. In some embodiments, segment matching server 106 presents a graphical map (e.g., Google Maps, MapQuest) and receives a series of selections of points on the map to indicate the course of a segment. This series of selections of points on the map need not be based on a recorded effort and can be merely be any geographical track that is of interest. For example, the selected segment can be a track that a cyclist has rode over before but has not documented the ride or the selected the segment can be a track that the cyclist would like to ride on in the future. The series of selections of points on the map can be converted into a series of GPS information (e.g., coordinates). In some embodiments, the series of GPS information is converted into an abstracted form and then stored as a segment.

In some embodiments, subsequent to a definition of a segment at the user interface, stored efforts (e.g., sets of GPS information from past physical activities) are compared to the defined segment. In some embodiments, when an effort is compared against this defined segment, it is determined whether the effort matches the segment in part by checking whether the GPS information of the effort indicates that the start and finish points of the segment have been crossed. Once one or more efforts are determined to match the segment, the data associated with the efforts are retrieved and analyzed. In some embodiments, the data associated with the newly defined segment is also included in the analysis. For example, the data can be compared to determine which effort matching the segment has the fastest time of completing the segment.

Segment matching server 106 is also configured to match efforts (e.g., sets of GPS information) to segments. In some embodiments, the effort is converted into the same abstracted form of a stored segment prior to determining matches for the effort. One purpose of matching efforts to segments is to find stored instances of physical activities that have occurred across the same demarcated tracks of interest (i.e., segments). Put another way, an effort that matches a segment refers to an instance of a physical activity that has taken place along a defined track. Once the instances of physical activities that have occurred over the same segment are found, their associated information (e.g., time of completion, speed, heart rate, and/or watts) can be compared to produce certain statistics (e.g., fastest time, highest watts) regarding athletic performance by one or more individuals across the same track. In some embodiments, for a newly defined segment, segment matching server 106 is configured to compare stored efforts to the segment. In some embodiments, the associated data of efforts are stored with the segments the efforts have been determined to match. In some embodiments, segment matching server 106 is configured to receive an effort (e.g., from device 102) and to compare the effort to stored segments to find match(es). In various embodiments, once an effort is found to match a segment, their associated data are compared (e.g., the associated data of all efforts that match the segment are compared).

Figure 2A:
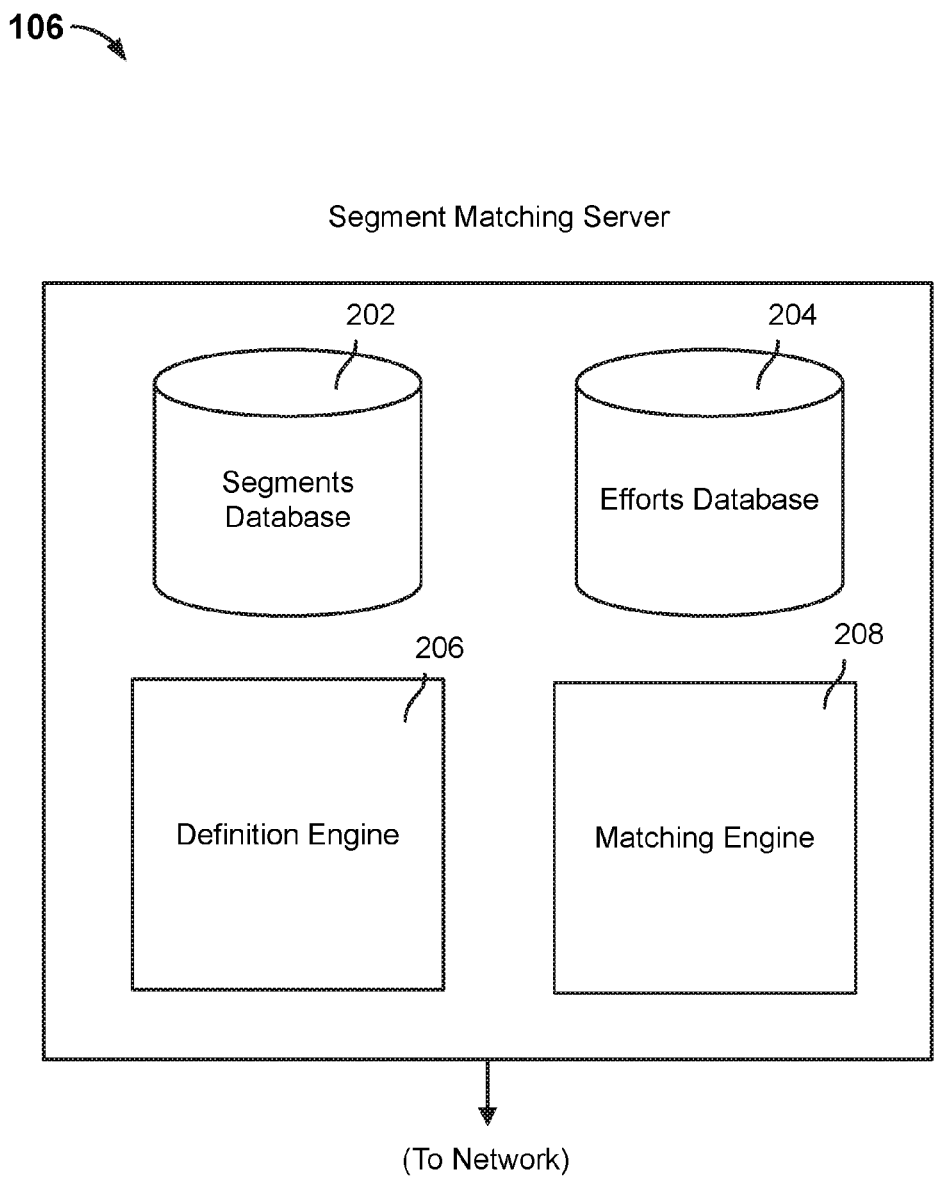
FIG. 2A is a diagram showing an embodiment of a segment matching server in accordance with some embodiments.

FIG. 2A is a diagram showing an embodiment of a segment matching server in accordance with some embodiments. In some embodiments, segment matching server 106 can be implemented with the example of FIG. 2A. In the example shown, segment matching server 106 includes segments database 202, efforts database 204, definition engine 206, and matching engine 208. However, segment matching server 106 can include more or fewer components. In some embodiments, a segment matching server is implemented using commercially available general purpose computing hardware (e.g., using a hosted service provider, such as Amazon's EC2 cloud executing a Linux operating system on commercially available servers, such as HP BladeSystem blade servers).

Segments database 202 is configured to store defined segments. While segments database 202 is shown to be one database in the example, a segments matching server may contain more than one database to store defined segments. In some embodiments, segments database 202 includes segments that are defined by users uploading a stored effort and indicating a start point and a finish/end point along a visual representation of the effort at a user interface. In some embodiments, segments database 202 includes segments defined by users making a series of selections along a track on a map at a user interface. In some embodiments, segments database 202 includes segments that are predefined (e.g., by administrators of segments server 106) based on known characteristics (e.g., information that is provided by professional associations) of various tracks or climbs. In some embodiments, segments are stored in segments database 202 in an abstracted form (e.g., as sets minimum bounding rectangles). One reason to store to store a segment in an abstracted form is so that a search query of similar segments or efforts that match segments can be efficiently performed. In some embodiments, segments data base 202 is organized based on the R-Tree index. In some embodiments, segments are stored in segments database 202 as sets of GPS data points. In some embodiments, each segment in the segments database 202 is stored with the identifiers of efforts from efforts database 204 that have been determined to match the segment. In some embodiments, each segment in the segments database 202 is stored with the associated data of the efforts that have been found to match the segment.

Efforts database 204 is configured to store efforts as sets of GPS information and timestamps. While efforts database 204 is shown to be one database in the example, a segments matching server may contain more than one database to store efforts. In some embodiments, effort database 204 includes efforts that are recorded and uploaded from devices (e.g., device 102). An effort stored at efforts database 204 includes at least GPS information, timestamps corresponding to the GPS information and metrics (e.g., associated data) related to the athletic performance of the effort. In some embodiments, the timestamps are included in the GPS information (e.g., the GPS information includes latitude and longitude coordinates with corresponding timestamps). In some embodiments, an effort is stored with an identifier for the athlete who performed the effort (e.g., the user of device 102). In some embodiments, each effort of efforts database 204 is stored with the identifiers of the segments of segments database 202 to which it has been determined to match.

Definition engine 206 is configured to receive definitions of segments. Definition engine 206 may be implemented with hardware and/or software. In some embodiments, definition engine 206 is configured to present a user interface (e.g., at a device). In some embodiments, the user interface displays a visual representation of an effort (e.g., recorded by the device) at the user interface. In some embodiments, definition engine 206 is configured to interact with third party map applications (e.g., Google Maps, MapQuest) through an API to obtain map services (e.g., displaying a map, receiving GPS coordinates of a selection on a displayed map, and/or other map services). A selection of a start point and a finish point are made at the user interface and received at definition engine 206. Then, definition engine 206 stores the track demarcated by the start and finish points as a segment at segments database 202. In some embodiments, a track (e.g., indicated as a series of selections) on a map displayed by the user interface is received at definition engine 206. Then, definition engine 206 stores the track that is marked on the map as a segment at segments database 202. In some embodiments, definition engine 206 converts a segment into an abstracted geographical form (e.g., as a set of minimum bounding rectangles) before storing it.

In some embodiments, definition engine 206 is configured to compare a newly defined segment to stored segments at segments database 202 to determine whether any existing segments are similar to the newly defined segment. In some embodiments, if it is determined that existing segments are similar to a newly defined segment, a display may alert the creator of the segment of the already existing segments. In some embodiments, the creator of the new segment may opt to forgo saving the new segment since similar ones have already been defined.

In some embodiments, definition engine 206 is configured to (e.g., periodically) compare the segments stored at segments database 202 to determine whether groups of two or more segments are similar. In some embodiments, for segments that are found to be similar, a display is presented with the segments so that only one may be chosen (e.g., crowd sourced by using a voting process with a community of users who use devices such as device 102) to remain in the database. The segments that are not chosen can be discarded from the database in order to free up space by removing redundant segments or demoting them so that they are not displayed as a public segment but may be retained for private use by the submitting user. In some embodiments, definition engine 206 is configured to determine that similar segments include segments that are entirely included by other segments (i.e., sub-segments and super segments). In some embodiments, a relationship between a segment and its super or sub segment is noted at segments database 202.

Matching engine 208 is configured to determine efforts that match to one or more segments (e.g., of segments database 202). In some embodiments, matching engine 208 is configured to access efforts stored at efforts database 204. In some embodiments, subsequent to a user definition of a segment (e.g., based on an uploaded effort or markings on a map), matching engine 208 accesses stored efforts to match the newly defined segment. For example, a user (e.g., a cyclist) can define a segment (and optionally, publicly share the segment for other users to see) and then receive information on past activities (e.g., past rides by the cyclist himself or other cyclists) that have traversed the defined segment. In some embodiments, matching engine 208 is configured to access segments stored at segments database 204. In some embodiments, in response to a received effort (e.g., sent by device 102), matching engine 208 determines whether the received effort matches any segments stored at segments database 202. For example, a user (e.g., a cyclist) can check whether a recently recorded effort (e.g., a bike ride) included one or more already defined segments. If it is determined that the effort includes a segment, then the associated data (e.g., athletic performance data) of the segment is accessed and compared to the associated data of the effort. This way, a user can benefit from an already defined segment by automatically being able to check for whether he has traversed the segment, without needing to manually determine where the segment begins or ends.

In some embodiments, matching engine 208 is configured to convert an effort (e.g., a set of GPS coordinates) into the same abstracted form (e.g., a set of minimum bounding rectangles) in which a segment is stored prior to performing a match against the stored segments (e.g., via querying the segments database). In some embodiments, two types of determinations (e.g., the effort is a loose match, the effort is a close match) can be made based on performing a match between an effort and the stored segments. An effort can be determined to be a loose match to a stored segment if their percentage of match exceeds a first threshold (e.g., 65% or greater). In some embodiments, an effort that is a loose match to a stored segment may entail that the recorded physical activity approximately traversed the same track as the matched segment. An effort can be determined to be a tight match to a stored segment if their percentage of match exceeds a second threshold (e.g., 80%) and in addition, the effort crosses the start and finish lines associated with the stored segment. In some embodiments, an effort that is a tight match to a stored segment may entail that the recorded physical activity closely traversed the same track as the matched segment. In various embodiments, determining a percentage of match for the two determinations (e.g., loose match and tight match) is performed in the same manner. In some embodiments, an effort can be determined to be a loose match to one or more segments and the effort can also be determined to be a tight match to one or more (of the same or different) segments. For example, an effort can be determined as a loose match to a segment and it can also be determined to be a tight match to the same segment. In another example, an effort can be determined as a loose match to one segment and a tight match to a different segment. In some embodiments, a determination of an effort as a loose match is made to one or more segments stored in a first database and a determination of the effort as a tight match is made to one or more segments stored in a second, different database.

In some embodiments, in the event that an effort is determined to match a segment (e.g., either as a loose match or tight match), then the associated data of the segment (e.g., associated data of stored efforts that have been determined to match the segment) is accessed to be compared against the associated data for the effort. In some embodiments, multiple stored efforts are determined to match a newly defined segment and the associated data for the matched segments are accessed, aggregated and analyzed. In some embodiments, matching engine 208 is configured to produce analysis results based on the retrieved data. In some embodiments, matching engine 208 sends the analyzed results to device 102 (e.g., for display as a user interface).

For example, a user can define a segment and all the stored efforts that match the segment can be aggregated and analyzed to produce a list of users who have traversed the segment in the fastest times or highest power (i.e., a leader board). In another example, a user can produce an effort and the segment matching server can determine whether the effort has traversed across any defined segments. If it is determined that the effort has traversed across a defined segment, then the data associated with that effort can be compared with the history of all efforts that have been determined to have traversed the defined segment. In this way, the user can determine how his athletic performance on the segment compares to all other efforts across the same geographical track (as represented by the segment). Furthermore, the user need not know (e.g., as he is on his bike ride) where exactly the segment begins or ends.

In some embodiments, device 102 may include segments database 202, efforts database 204, definition engine 206 and matching engine 208 or equivalent functionalities such that device 102 can store segments, store efforts, define segments, and match an effort to segments at device 102 (without needing to send or receive information from segments matching server 106). In some embodiments, an efforts database at device 102 includes only the efforts produced by the user of the device.

FIG. 2B is a diagram showing an example of efforts stored in a table at the efforts database in accordance with some embodiments. In some embodiments, the efforts stored at efforts database 204 can be stored in a manner similar to the example of FIG. 2A. However a table of efforts at a database can include more or fewer columns than the ones shown in the example. In the example, each effort is stored with an effort ID, its series of GPS information (e.g., GPS coordinates with respective timestamps), an identifier associated with the user who recorded the effort, the date the effort was recorded, and associated data including speed (km/h), heart rate (beats per minute), power (watts), and time (hours: minutes). In some embodiments, when an effort is compared to a segment, the GPS information (e.g., the series of GPS coordinates with timestamps) of the effort is accessed and used for the comparison. In some embodiments, when an effort is determined to match a segment, the associated data (e.g., speed, heart rate, power, time, elevation, grade) for the effort is aggregated with the associated data of other efforts (if any) that also match the segment. The aggregated data is then analyzed (e.g., to produce displays that summarize the aggregated data).

Figure 3:
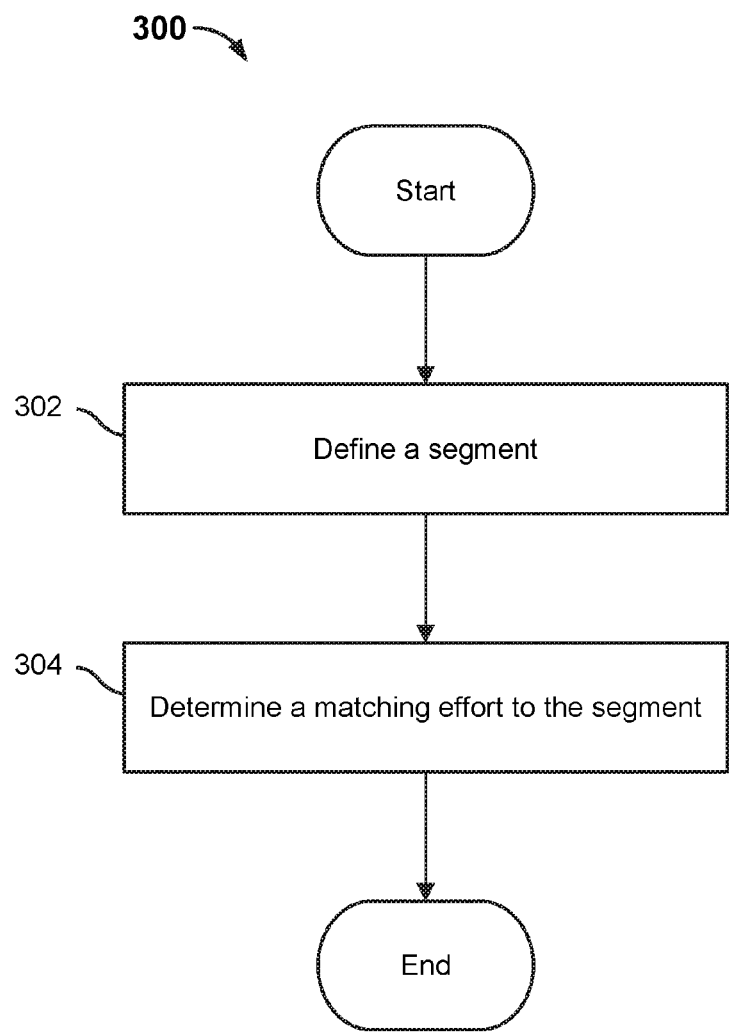
FIG. 3 is a flow diagram showing an embodiment of a process for segment matching in accordance with some embodiments.

FIG. 3 is a flow diagram showing an embodiment of a process for segment matching in accordance with some embodiments. In some embodiments, process 300 is implemented on system 100.

At 302, a segment is defined. In some embodiments, a segment is defined by a user at a user interface by selecting a start and end point along a visual representation of an effort (e.g., series of GPS information with timestamps). In some embodiments, the effort is recorded by a device equipped with a GPS-tracking functionality. In some embodiments, a segment is defined by a user at a user interface by selecting a series of points on a map (e.g., supported by a third party map software such as Google Maps). In some embodiments, a segment is defined (e.g., by administrators of a segments matching server) using known characteristics (e.g., elevation and average grade) of a geographical track. Defined segments are stored in one or more databases. In some embodiments, a defined segment is converted into an abstracted form (e.g., as a set of minimum bounding rectangles) and stored in their abstracted forms. In some embodiments, a database in which segments are stored is organized based on the R-Tree index.

At 304, a matching effort to the segment are determined. In some embodiments, for a defined segment, information regarding stored efforts are accessed and compared against the segment. In some embodiments, efforts are stored as sets of GPS information with timestamps (and with associated data such as various metrics of athletic performance). In some embodiments, the GPS information of the stored efforts are accessed and converted into whichever form the segment is in (e.g., minimum bounding rectangles) before the comparisons are made. In some embodiments, stored efforts are compared against the segment to determine a subset of stored efforts that match the segment. The associated data for the subset of stored efforts that are found to match the segment is accessed (e.g., from the same database that stores the efforts) and aggregated. The aggregated associated data is analyzed and in some embodiments, the result(s) of the analysis is presented in table(s) (e.g., leader boards) and/or visual(s).

Figure 4:
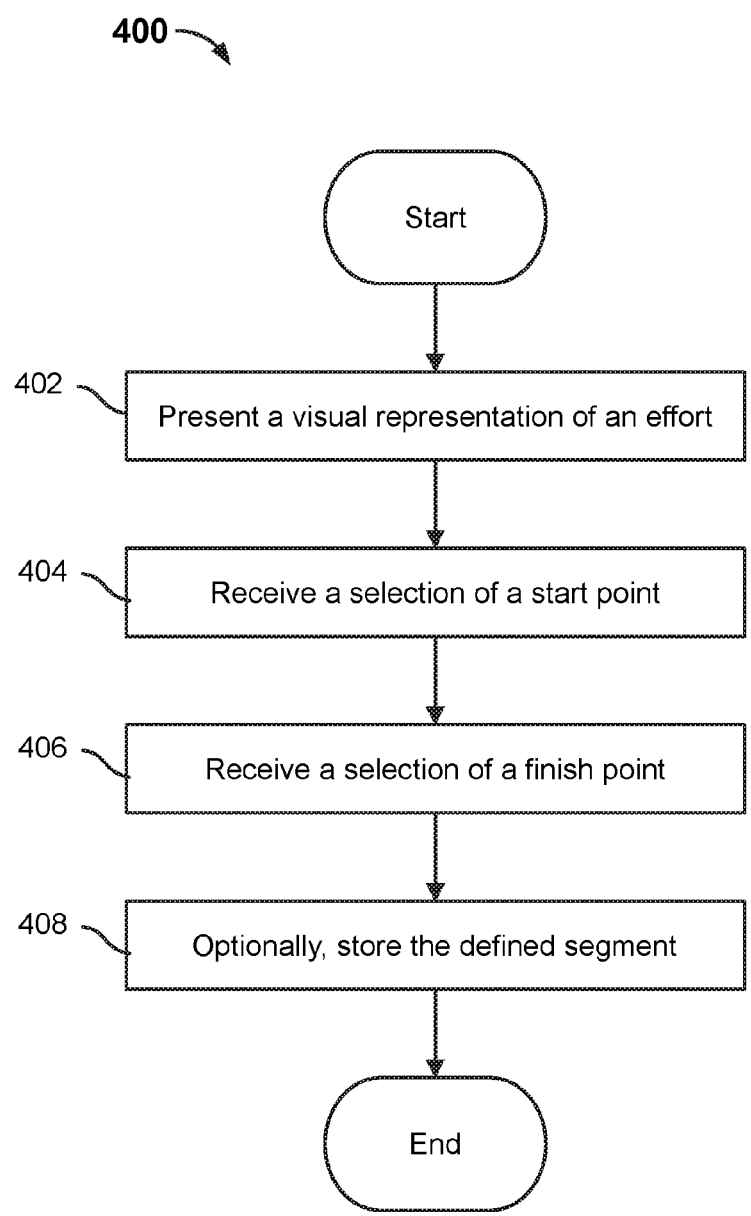
FIG. 4 is a flow diagram showing an embodiment of the process of defining a segment based on an effort in accordance with some embodiments.

FIG. 4 is a flow diagram showing an embodiment of the process of defining a segment based on an effort in accordance with some embodiments. In some embodiments, process 400 can be implemented using system 100. In some embodiments, process 400 can be used to implement 302.

At 402, a visual representation of an effort is presented. In some embodiments, the effort is a series of GPS information with timestamps that is recorded by a device equipped with GPS-tracking functionality. In some embodiments, the visual presentation is presented at a user interface. For example, the GPS coordinates can be displayed as a continuous line on a map or a series of markers on a map (e.g., supported by a map application such as Google Maps). In some embodiments, even though a series of GPS information is a set of discrete geographical coordinates, the points in between two coordinates can be extrapolated in producing a visual representation that is in the form a continuous line.

For example, a user (e.g., a cyclist) has completed a bike ride and would like to designate at least a portion of the ride as a segment. This way, the cyclist or other cyclists may be able to track and compare their performances across the geographical track that is referenced by the segment.

At 404, a selection of a start point is received. In some embodiments, a user selects a point along the visual presentation at the user interface to be the start point of the segment. In some embodiments, if the selected point has been crossed more than once in the effort, then a display is generated to indicate each of the times along the effort that the selected start point was crossed. The user may then select the time corresponding to the desired instance that he or she would like to represent as the start point. In some embodiments, the selected start point is stored as its corresponding GPS coordinates (e.g., as returned by an API associated with the map application). In some embodiments, the selected start point is stored with a virtual starting line that is derived based on the selected start point and other point(s) of the effort.

Returning to the previous example, the cyclist can select a point along his ride to designate as the starting point of the segment. The start point need not be at the starting point of the entire segment, but can be any point along the ride. The start point can be thought of as the starting line for a race. When it is later determined whether another cyclist (or the same cyclist on a different occasion) has rode over the segment, it is determined whether the subsequent ride (i.e., effort) has crossed the starting point.

At 406, a selection of a finish point is received. In some embodiments, a user selects a point along the visual presentation at the user interface to be the finish or end point of the segment. In various embodiments, the technique for selecting and storing a finish point is the same as that is used for a start point. For example, a selected finish point can be stored as its corresponding GPS coordinates and/or with a derived virtual finish line.

Returning to the example, the cyclist can select a point along his ride to designate as the finish point of the segment. The finish point need not be at the very end of the ride, but can be any point that is subsequent to the start point. The finish point can be thought of as a finish line for a race. When it is later determined whether another cyclist (or the same cyclist on a different occasion) has rode over the segment, it is determined whether the subsequent ride (i.e., effort) has also crossed the finish point. In some embodiments, if the segment to be defined comprises a loop, then the selected start and end points can be the same set of GPS coordinates.

At 408, the defined segment is optionally stored. In some embodiments, if the defined segment is determined to be similar to already existing segments (e.g., in a data store that includes predefined and/or user defined segments, such as a segment database), then the user is prompted with a corresponding display. In some embodiments, the user can review the existing segments and/or choose to discard the newly defined segment in light of the existing, overlapping segments. In the event that the user chooses to discard the newly defined segment, he or she can choose to associate his effort with an existing segment and store the data associated with his effort with the existing segment. In some embodiments, if the user defined segment matches an existing segment, then the matched existing segment is already stored (e.g., in a data store that includes predefined and/or user defined segments, such as a segment database). If there are no existing similar segments or if the user chooses to store the newly defined segment anyway despite a possible overlap, the newly defined segment is stored. In some embodiments, the segment is converted into an abstracted form (e.g., as a set of minimum bounding rectangles) and then stored. In some embodiments, the newly defined segment can be saved with a name and/or one or more tags (e.g., that are chosen by the user). In some embodiments, stored efforts are accessed to match against this segment. If/when matching efforts are found; the data associated with the matching efforts are combined and compared.

Returning to the example, the cyclist can use the user interface to create the segment. The cyclist can also input the segment name as "Old La Honda" to associate the segment with the name of the road along which the segment exists. The cyclist can also receive feedback on past rides that have occurred on the "Old La Honda," (e.g., as determined by segment matching) such as which users have rode on the segment, when, who had the fastest time, who expended the most amount of energy in completing the segment. The cyclist can also see how his own performance over the "Old La Honda" fares in comparison to past rides (e.g., where the user's performance ranks among the history of rides over the segment). Subsequent users can also search for this segment by entering in "Old La Honda" at a user interface that supports searching through a segments database. Subsequent users can also check to see if they have ridden over "Old La Honda" by recording a ride and sending the ride to be checked for matching segments. If it is determined (e.g., as determined by segment matching), that the ride includes the "Old La Honda" segment, then the subsequent user's performance during the ride for the length of the segment can be compared to the historical performance of the other users who have ridden over the segment.

Figure 5:
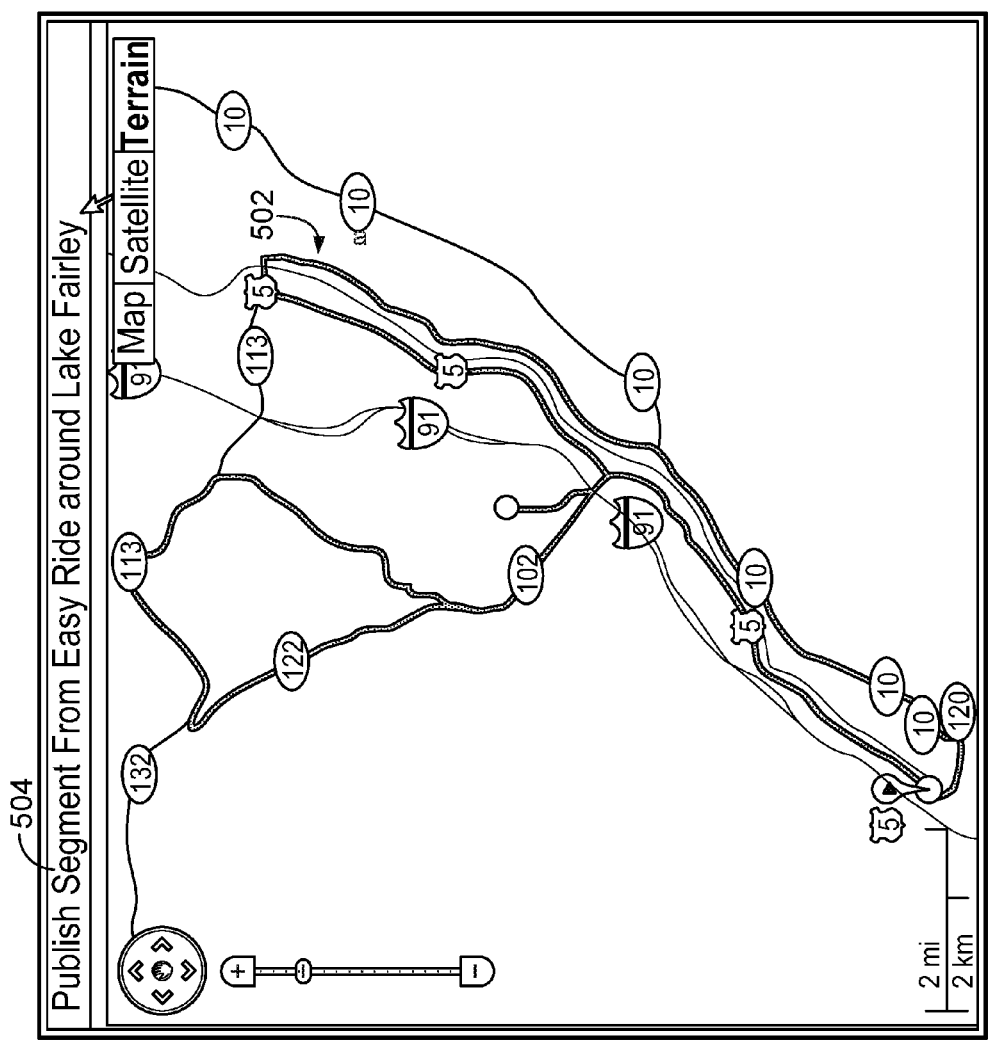
FIG. 5 is a diagram showing an example of a user interface for defining a segment based on an effort in accordance with some embodiments.

FIG. 5 is a diagram showing an example of a user interface for defining a segment based on an effort in accordance with some embodiments. In some embodiments, 402 is implemented using the example of FIG. 5. In the example shown, the dark line located on the map is visual presentation 502 that is rendered from, for example, an effort (e.g., a series of GPS information with timestamps) recorded by a GPS device. As shown in the example, the name of the effort from which a segment is to be selected is indicated in area 504 as "Easy Ride around Lake Fairley." In some embodiments, the map used in the user interface is supported by a map application such as Google Maps. The map application can be interacted through an associated API.

Figure 6:
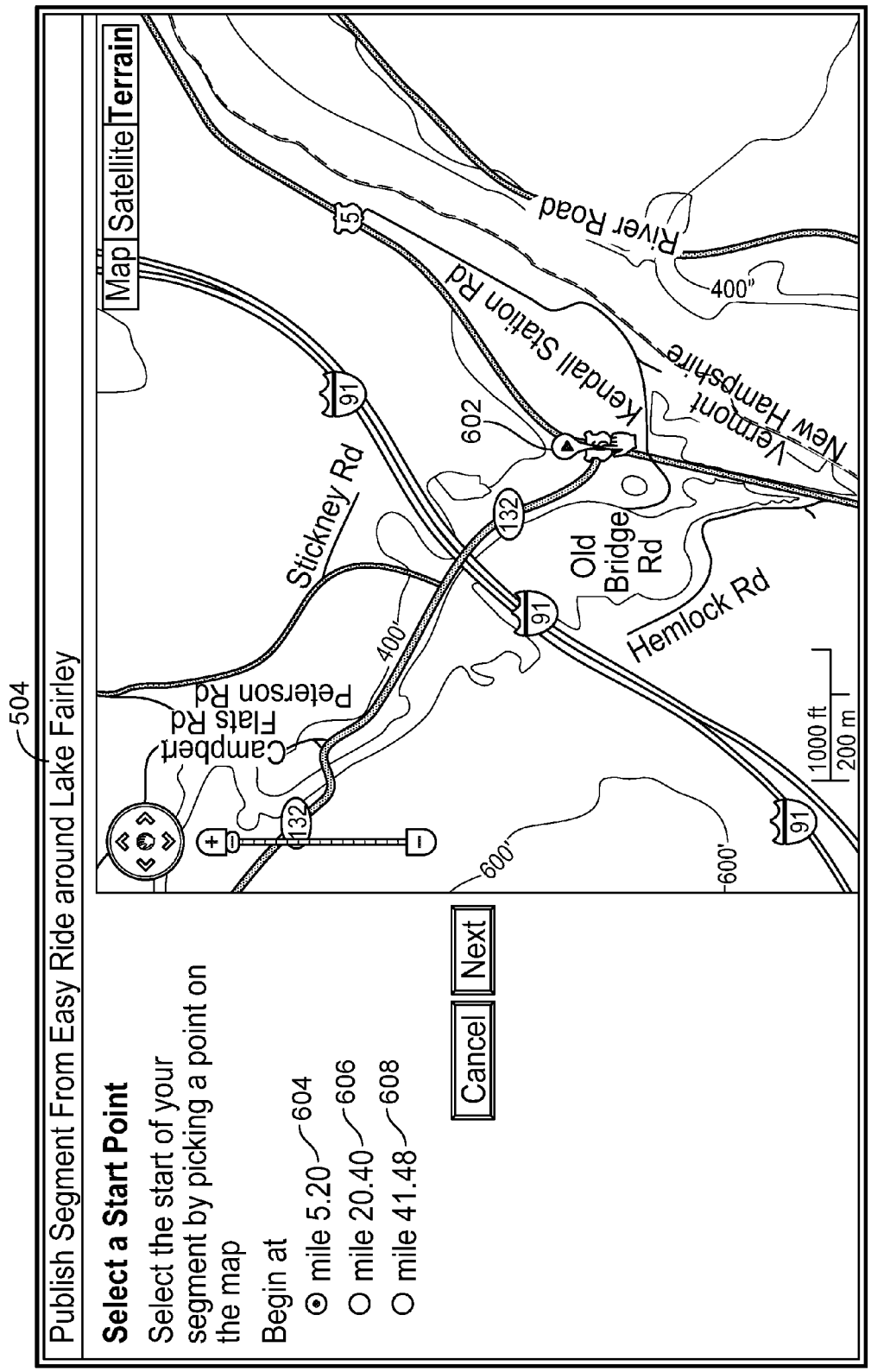
FIG. 6 is a diagram showing an example of a user interface showing a selection of a start point for a segment in accordance with some embodiments.

FIG. 6 is a diagram showing an example of a user interface showing a selection of a start point for a segment in accordance with some embodiments. In some embodiments, 404 is implemented using the example of FIG. 6. In the example shown, the map showing visual presentation 502 is zoomed in on an area in which the start point is to be selected. In some embodiments, the start point can be selected through clicking on a location of the map. In the example shown, marker 602 indicates the selected start point along the effort. In the example shown, the selected start point was crossed at three different times (604, 606, and 608) along the effort. The user is prompted to select the desired time to set as the start point. In some embodiments, the user is prompted to select one of multiple possible start points because the length of the defined segment is determined based on the length of the effort in between the start and finish points. In some embodiments, the selected start point is stored as a set of GPS coordinates. In some embodiments, the selected start point is stored with a virtual starting line derived in part from the start point.

Figure 7:
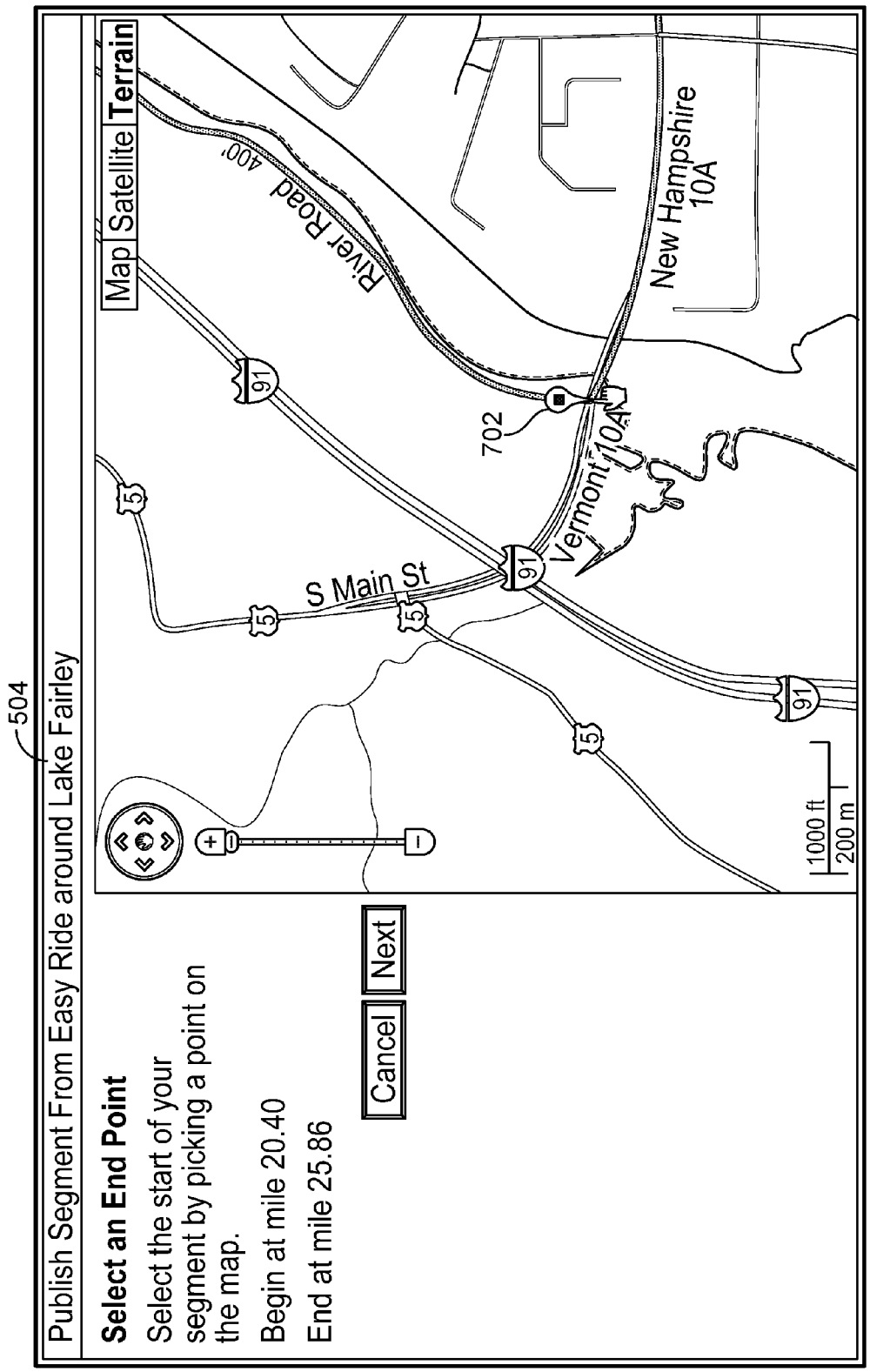
FIG. 7 is a diagram showing an example of a user interface showing a selection of a finish point for a segment in accordance with some embodiments.

FIG. 7 is a diagram showing an example of a user interface showing a selection of a finish point for a segment in accordance with some embodiments. In some embodiments, 406 is implemented using the example of FIG. 7. In some embodiments, a finish point is selected and also stored by the same techniques used for a start point. In the example shown, marker 703 indicates the selected finish (e.g., end) point of the segment. In some embodiments, the selected finish point is stored as a set of GPS coordinates. In some embodiments, the selected finish point is stored with a virtual finish line derived in part from the finish point.

Figure 8:
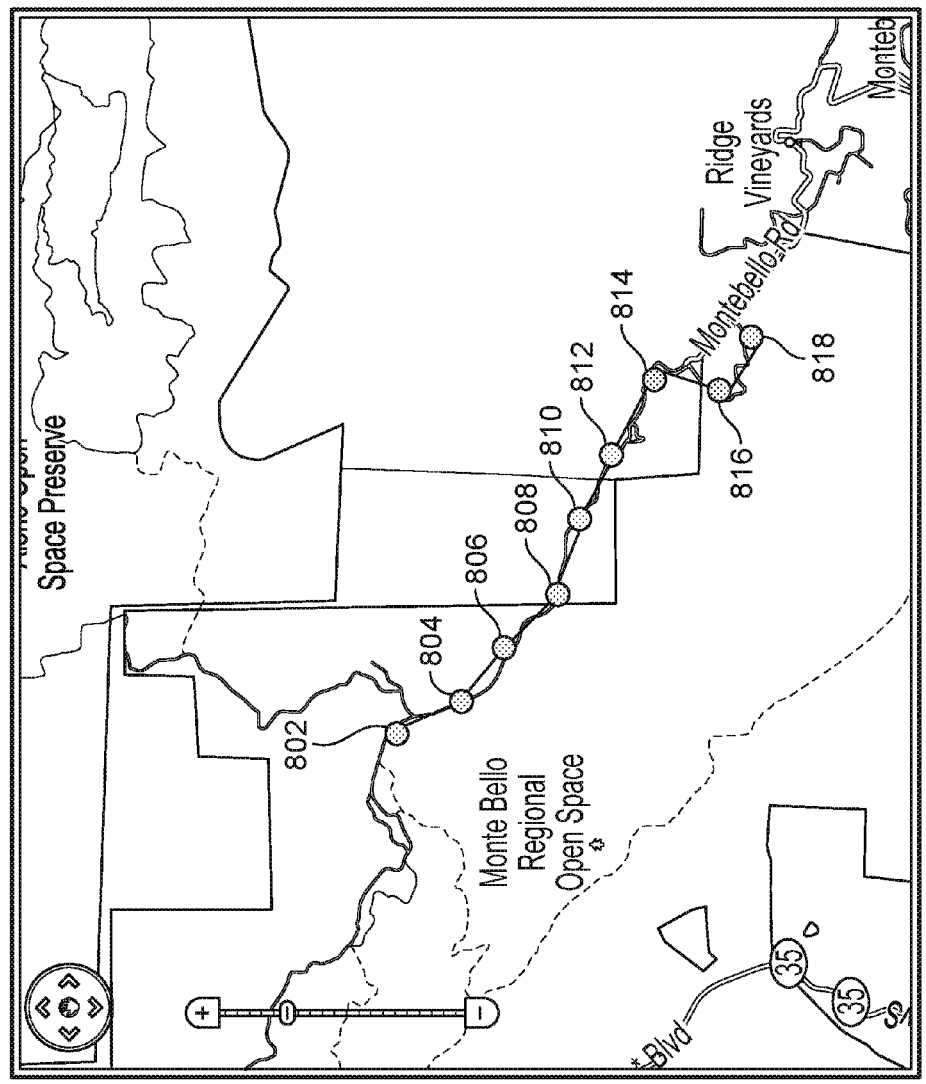
FIG. 8 is a diagram showing an example of a user interface for defining a segment using a series of selections on a map in accordance with some embodiments.

FIG. 8 is a diagram showing an example of a user interface for defining a segment using a series of selections on a map in accordance with some embodiments. In some embodiments, the example shown can be used to implement 302. In some embodiments, a segment can be defined through directly making selections on a map at a user interface. As opposed to the technique of defining a segment as shown in FIGS. 5, 6, and 7, the technique of defining a segment in the example of FIG. 8 does not require a recorded effort. In the example shown, a user has sequentially dropped markers 802 to 818 along a track (e.g., "Montebello Rd") on the map to indicate a segment. The set of geographical information of markers 802 to 818 can be obtained from the map application (e.g., Google Maps) and stored as a segment. In some embodiments, the first dropped marker for the segment is considered to be the start point and the last dropped marker is considered to be the finish point.

Figure 9:
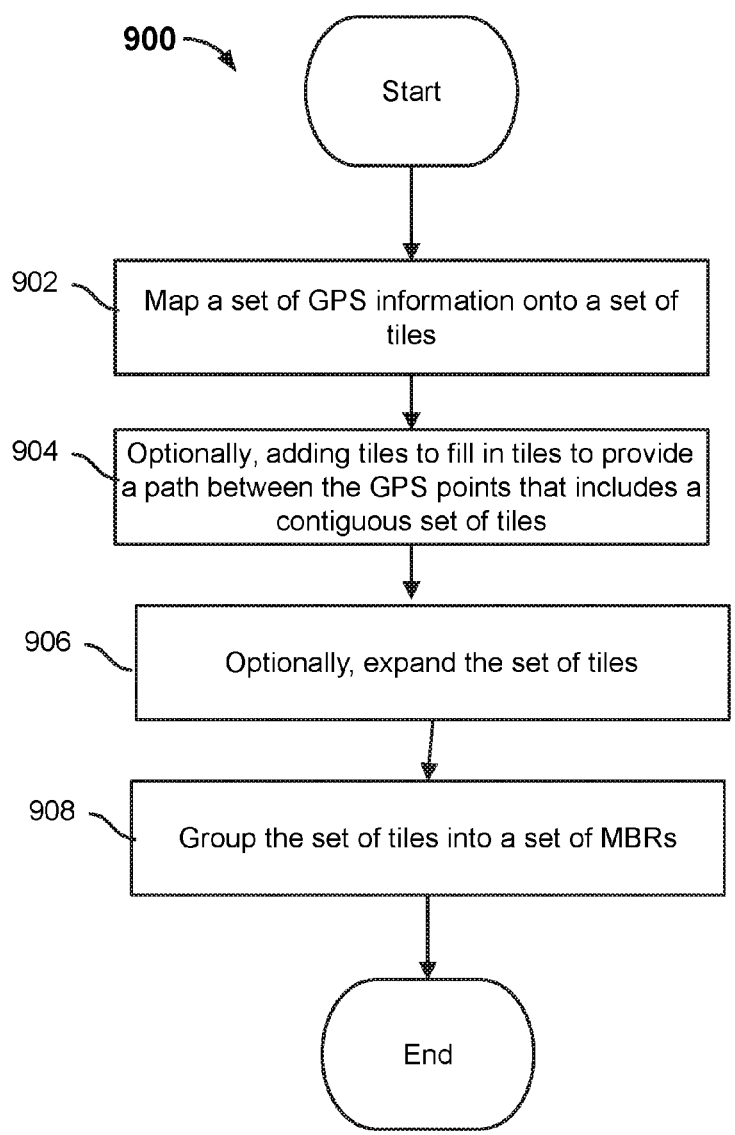
FIG. 9 is a flow diagram showing an embodiment of converting a series of GPS information into a set of minimum bounding rectangles (MBRs) in accordance with some embodiments.

FIG. 9 is a flow diagram showing an embodiment of converting a series of GPS information into a set of minimum bounding rectangles (MBRs) in accordance with some embodiments. In some embodiments, a series of GPS information (e.g., used to define a segment based a recorded effort, for a series of selections on a map supported by a map application) are converted into a set of minimum bounding rectangles (MBRs) to be stored for a segment. In some embodiments, a series of GPS information are converted into a set of MBRs to be used for querying a R-Tree indexed database of segments that are stored as sets of MBRs.

One reason to convert a series of GPS information into a set of MBRs is that in various embodiments, MBRs can be used to perform an efficient bounding box query on an R-Tree indexed database of MBRs. In some embodiments, a search input for a query of a R-Tree database (e.g., for defined segments) is a MBR (e.g., associated with an effort) and the query returns MBRs (e.g., associated with segments) that overlap the input MBR. In some embodiments, whether an effort is similar to (e.g., matches) a segment depends on the extent that their MBRs are found to overlap using the bounding box query. In some embodiments, whether one segment is similar to another segment also depends on the extent that their MBRs overlap.

At 902, a series of GPS information is mapped on to a set of tiles. In some embodiments, the series of GPS information is from an effort recorded by a device equipped with GPS-tracking functionality. In some embodiments, the series of GPS information corresponds to a segment (e.g., defined at a user interface).

A known technique of universal tiling is used to divide an area of geography that is of interest into generally uniform tiles. For example, each tile can be 20 meters by 20 meters. This universal tiling scheme is applied to the series of GPS information to result in a set of corresponding tiles. For example, each tile that contains a GPS coordinate (and also any tiles in between two such tiles) is included in the set of tiles. In some embodiments, any two geographic tracks covering roughly the same terrain will map to the same set of universal tiles despite small differences in their respective sets of GPS information.

At 904, optionally, tiles are added to fill in tiles to provide a path between the GPS points that includes a contiguous set of tiles. For example, if two consecutive GPS points do not map to adjacent tiles, then any tiles traversed by the line connecting the consecutive GPS points can be added to the set of tiles (e.g., filling in the tiles between the GPS points before expansion).

At 906, optionally, the set of tiles is expanded. In some embodiments, the set of tiles can be expanded to encompass adjacent tiles to compensate for differences in GPS data. For example, the adjacent eight tiles of each tile in the set of tiles produced at 902 can be included in the set of tiles, if they are not already included. However, the set of tiles can be expanded in other appropriate ways as well.

At 908, the set of tiles are grouped into a set of MBRs. In some embodiments, tiles in the set that are close to each other are grouped into one MBR. In some embodiments, each dimension (e.g., height, width) of a MBR is a one or more entire tiles. For example, to group a set of tiles into a set of MBRs, the tiles of the set are first merged into a set of non-overlapping rectangular boxes. In one approach, cells that adjoin horizontally are merged into a set of wide boxes, each one tile tall. Next, each box is then compared to the boxes on the row below, and if there is a box of the same width and horizontal position, they are merged. The resulting set of boxes is the desired set of MBRs. However, grouping the set of tiles into a set of MBRs is not limited to only the previous example.

In some embodiments, each MBR is identified by the coordinates of its four respective corners (e.g., on the tiling scheme). In some embodiments, the set of MBRs is stored at a database for segments. For example, the MBRs of the set can be stored in rows of a R-Tree indexed database table. The MBRs of the set can also be stored with an identifier associated with the segment they represent.

However, in some embodiments, a segment can be stored as the corresponding set of GPS data points (as opposed to being converted into MBRs and then stored).

Figure 10A:
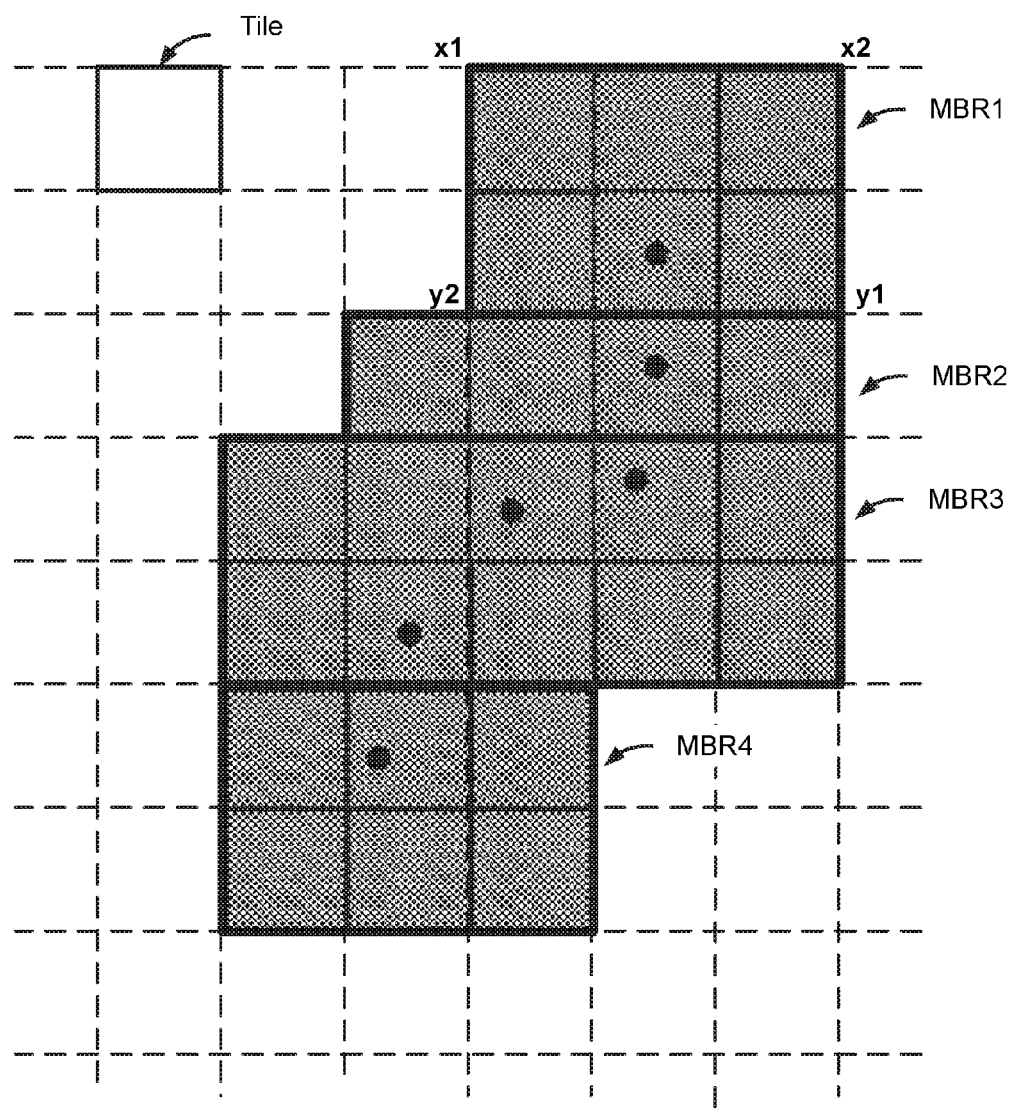
FIG. 10A is a diagram showing an example of converting a series of GPS information into a set of MBRs in accordance with some embodiments.

FIG. 10A is a diagram showing an example of converting a series of GPS information into a set of MBRs in accordance with some embodiments. In some embodiments, the example of FIG. 10A is a result of applying process 900 to a series of GPS information. In the example shown, a recorded bike ride includes a set of GPS coordinates, which are represented by the small, black circles. Each tile of the universal tiling scheme that includes a GPS coordinate is included in the set of tiles to which the GPS information is mapped as well as any tiles traversed by line segments that connect consecutive GPS points. In the example shown, a tile included in the set of tiles is shaded in. The adjacent eight tiles of each tile in the set are also included in the expanded set of tiles (if the tiles have not been previously included). The expanded set of tiles is then grouped into four MBRs (which are identified by MBR 1, MBR 2, MBR 3, and MBR 4). In the example shown, each MBR is outlined by a dark border. Each MBR can be identified by the set of coordinates (x1, x2, y1, y2) (e.g., of the tiling scheme) that represent its four corners. If the series of GPS information is intended to define a segment, then the corresponding set of MBRs can be stored, in some embodiments, in a table at a R-Tree indexed database with the identifier of the segment.

Figure 10B:
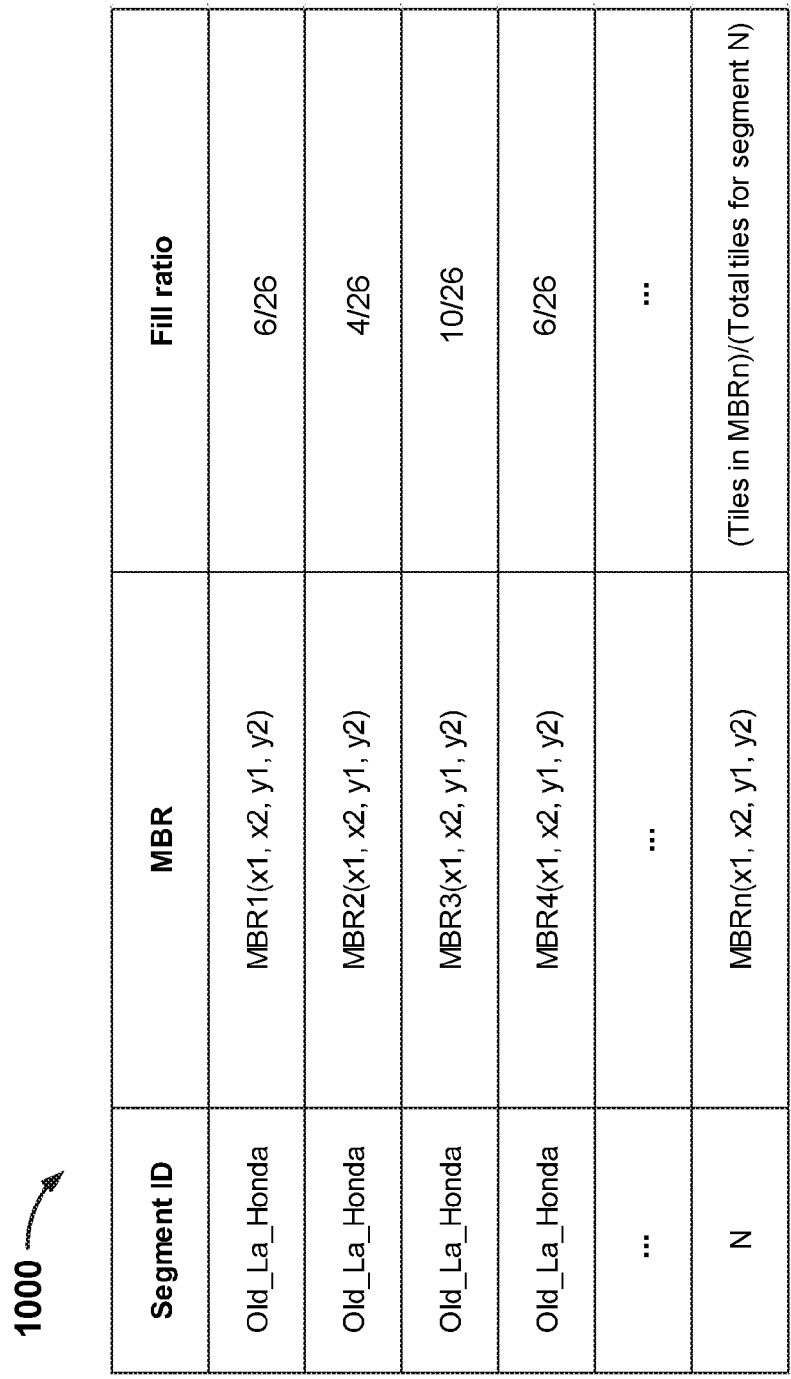
FIG. 10B is a diagram showing an example of entries of a database table for storing segment information in accordance with some embodiments.

FIG. 10B is a diagram showing an example of entries of a database table for storing segment information in accordance with some embodiments. In some embodiments, the database is a R-Tree indexed database. For example, the database can be MySQL, Oracle, or Postgres. In some embodiments, the example of FIG. 10B includes the stored set of MBRs created in the example of FIG. 10A. In some embodiments, each segment in a segments database is stored with an alphanumeric identifier. Assume that the example of FIG. 10A created a set of MBRs for the segment with the identifier of "Old_La_Honda." As shown in the example of FIG. 10B, each MBR is stored with its segment identifier, its four coordinates, and a fill ratio. In the example shown, a fill ratio refers to the number of tiles associated with the segment that are included in the MBR over the total number of tiles associated with the segment. In some embodiments, the fill ratio can be represented as a percentage. For example, as shown in FIG. 10A, there were 26 shaded-in tiles and thus 26 tiles associated with the segment "Old_La_Honda." Since there are six of those 26 tiles enclosed within MBR1, the fill ratio entry for MBR1 in the database is "6/26."

While the example of FIG. 10B includes only four entries (for each of the MBRs in the set) for a segment, an actual segment may include thousands of entries at the database, depending on the length of the track. In some embodiments, entries of a database for storing segment information can include more or fewer columns than the ones shown in the example of FIG. 10B. In some embodiments, a set of information for a segment stored at a database includes all the efforts (e.g., from an efforts database) and their associated data that have been determined to match the segment. That way, when a segment is retrieved from a database, a history of athletic performance (e.g., as represented by the matched efforts and their associated data) can be quickly accessed as well.

Figure 11A:
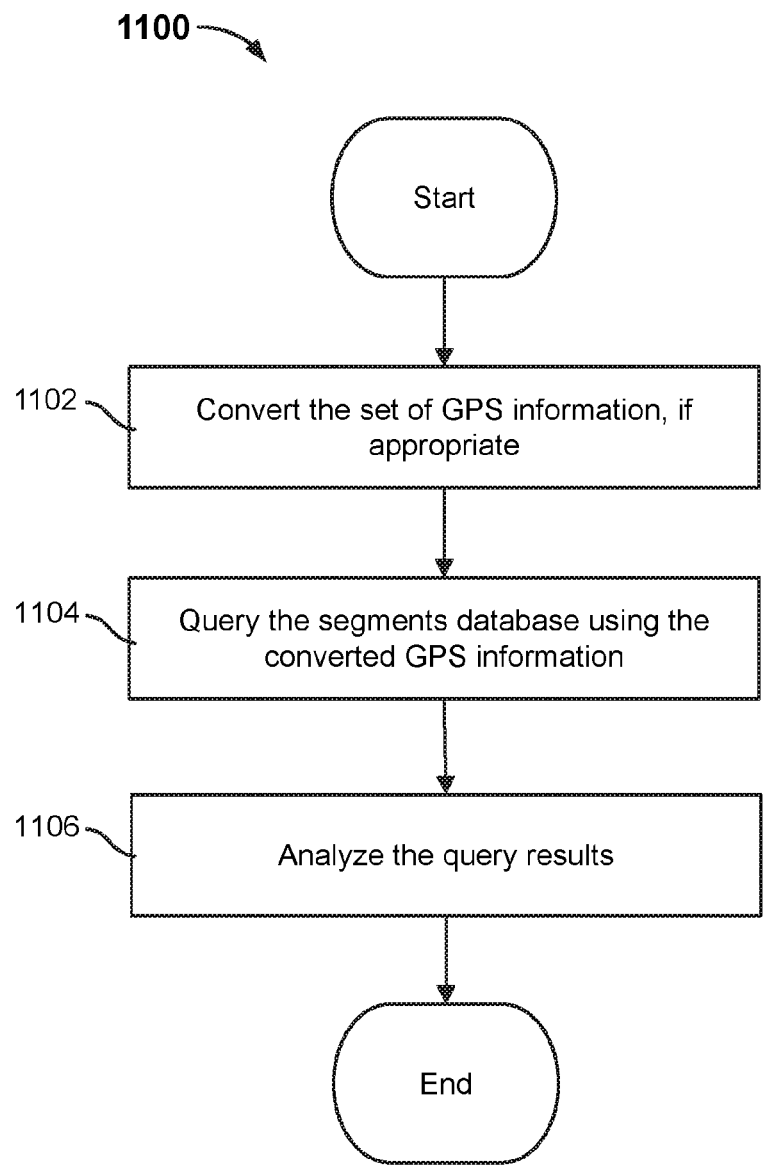
FIG. 11A is a flow diagram showing an embodiment for the process of searching for matching segments at a segments database in accordance with some embodiments.

FIG. 11A is a flow diagram showing an embodiment for the process of searching for matching segments at a segments database in accordance with some embodiments.

In some embodiments, a segment is stored as a set of MBRs in a R-Tree indexed database. In some embodiments, a segment is stored as a set of GPS data points in a database.

In some embodiments, a segments database is queried to determine whether the query input (e.g., a geographical track that is represented by a series of GPS data points) matches to a defined segment at the database. As used herein, a series of GPS information (e.g., belonging to an effort) matches to another series of GPS information (e.g., belonging to a segment) when their percentage of match exceeds a certain threshold.

At 1102, a series of GPS information is converted, if appropriate. In some embodiments, the series of GPS information is extracted from an effort (e.g., recorded by a GPS-enabled device). In some embodiments, the GPS information is a series of consecutive GPS data points. In some embodiments, the segments are stored in an abstracted form such as a set of MBRs. If the segments are stored as sets of MBRs, then the series of GPS information is also converted into a set of MBRs. In some embodiments, segments are stored as set of GPS data points so the GPS information does not need to be converted into another form.

At 1104, the segments database is queried using the GPS information. In some embodiments, a query of the database returns portions (e.g., GPS data points, MBRs) of segments that are similar to the series of GPS information.

In some embodiments, the segments are stored as sets of MBRs at a R-Tree indexed database. For example, to search at the database, the MBRs converted from the GPS information are used to perform a bounding box query on the R-Tree indexed database. The query returns MBRs that overlap with the input MBRs. Overlapping MBRs are considered to be similar. For overlapping MBRs, their respective entries from a table (e.g., table 1000 of FIG. 10B) at the database can be returned. Referring to table 1000, in this example, assume that MBR1, MBR2, and MBR3 (which all belong to segment "Old_La_Honda") have been found to overlap. Thus, the respective rows for MBR1, MBR2, and MBR3 can be returned so that their entries may be analyzed (e.g., to determine whether the set of input MBRs matches to the segment of "Old_La_Honda"). In some embodiments, overlapping MBRs associated with more than one segment may be returned.

In some embodiments, the segments are stored as sets GPS data points at a database. Various search techniques for determining similar series of GPS data points (e.g., within a tolerance) may be employed to find similar segments at the database. In one example technique, each GPS data point at the database is assumed to include a tolerance zone that is indicated by a radius of a selected length (e.g., 50 meters). Each point in the series of GPS information is also assumed to include a tolerance zone that is indicated by a radius of a selected length, which can be the same length as the radius of a point at the database. As a result, each GPS data point can be thought of as spanning a circle of area. Subsequently, the circular area of each point in the series of GPS information is used to search for an overlapping circle associated with a GPS data point (associated with a segment) at the database. In some embodiments, GPS data points of the database that correspond to the overlapping circles can be returned. In some embodiments, GPS data points associated with more than one segment may be returned.

In some embodiments, searching for similar segments using a series of GPS data points requires more computational time and/or resources than is needed for using MBRs and a R-Tree indexed database.

1106, the query results are analyzed. In some embodiments, the query results are used to determine whether the series of GPS information matches any segments at the database. In some embodiments, a calculation is performed to determine the percentage of match between the series of GPS information and the returned (portions of) one or more segments.

In some embodiments, when the segments are stored as MBRs, the percentage of match is determined using the returned MBRs. In some embodiments, the percentage of match of a series of GPS information to a segment is calculated based on the ratio between the number of overlapped MBRs of the segment to the total number of MBRs for the segment. If the ratio exceeds a threshold, then the geographical track represented by the series of GPS information is considered to match the segment. In some embodiments, the similarity of a series of GPS information to a segment is calculated based on the sum of the fill ratios of the returned MBRs. If the sum of the fill ratios exceeds a threshold, then the geographical track represented by the series of GPS information is considered to match the segment. In some embodiments, MBRs returned as a result of the query (e.g., 1104) include their respective rows from a table at the database. Referring to the table of FIG. 10B, in this example, assume that that MBR1, MBR2, and MBR3 (all belonging to segment "Old_La_Honda") have been found to overlap. Thus, the respective rows for MBR1, MBR2, and MBR3 are returned. In this example, the similarity between the series of GPS information and the "Old_La_Honda" segment is calculated based on the sum of the fill ratios for the overlapped MBRs. Since MBR1, MBR2, and MBR3 are overlapped, the sum of their respective fill ratios (i.e., 6/26+4/26+10/26) is 20/26 or about 76.9%. If the threshold percentage for a match is 65%, then the series of GPS information is considered to match the "Old_La_Honda" segment. In some embodiments, MBRs can be returned for more than one segment and the similarity to each of those segments can be determined.

In some embodiments, when the segments are stored as sets of GPS data points, the percentage of match is determined based on the number of GPS data points that are returned by the query. In some embodiments, if the ratio of the number of GPS data points returned by the query to the total number of GPS data points associated with the segment exceeds a certain threshold, then the geographical track represented by the series of GPS information is considered to match the segment. In some embodiments, GPS data points can be returned for more than one segment the percentage of match to each of those segments can determined In some embodiments, if the percentage of match between the series of GPS information falls below a threshold (e.g., 65%), then the geographical track is considered to not match the segment. In some embodiments, there are multiple thresholds for which a series of GPS information can match a segment. In some embodiments, a series of GPS information can match a segment at lower threshold (e.g., between 65% to 79%) and be considered as a loose match of the segment. In some embodiments, a series of GPS information can match a segment at a higher threshold (e.g., between 80% and 100%) and be considered as a candidate to be a close match of the segment. In some embodiments, to be considered to a close match of the segment, not only does the series of GPS information need to match the segment at a higher threshold, but the series of GPS information also needs to cross the virtual start and finish lines of the segment. When a series of GPS information is considered to be a loose match to a segment, it implies that the geographical track (e.g., effort) associated with the GPS information does not closely follow the track referenced by the segment. For example, a cyclist who intends to take a leisurely bike ride along the general terrain demarcated by a segment can deviate somewhat from the exact segment. When a series of GPS information is considered to be a tight match of the segment, it implies that the geographical track associated with the GPS information has closely followed the track referenced by the segment. For example, a cyclist who intends to compete his time (or another performance metric) across a segment against his own record or the performances of others would need to follow more closely to the region demarcated by a segment. Also, the cyclist who aims to compete his time would need to cross the virtual start and finish lines of the segment (or if the segment forms a loop and then the cyclist would need to cross his or her entry point at the loop segment for a second time) to ensure that the full length of the segment (rather than only a portion thereof) was traveled.

Figure 11B:
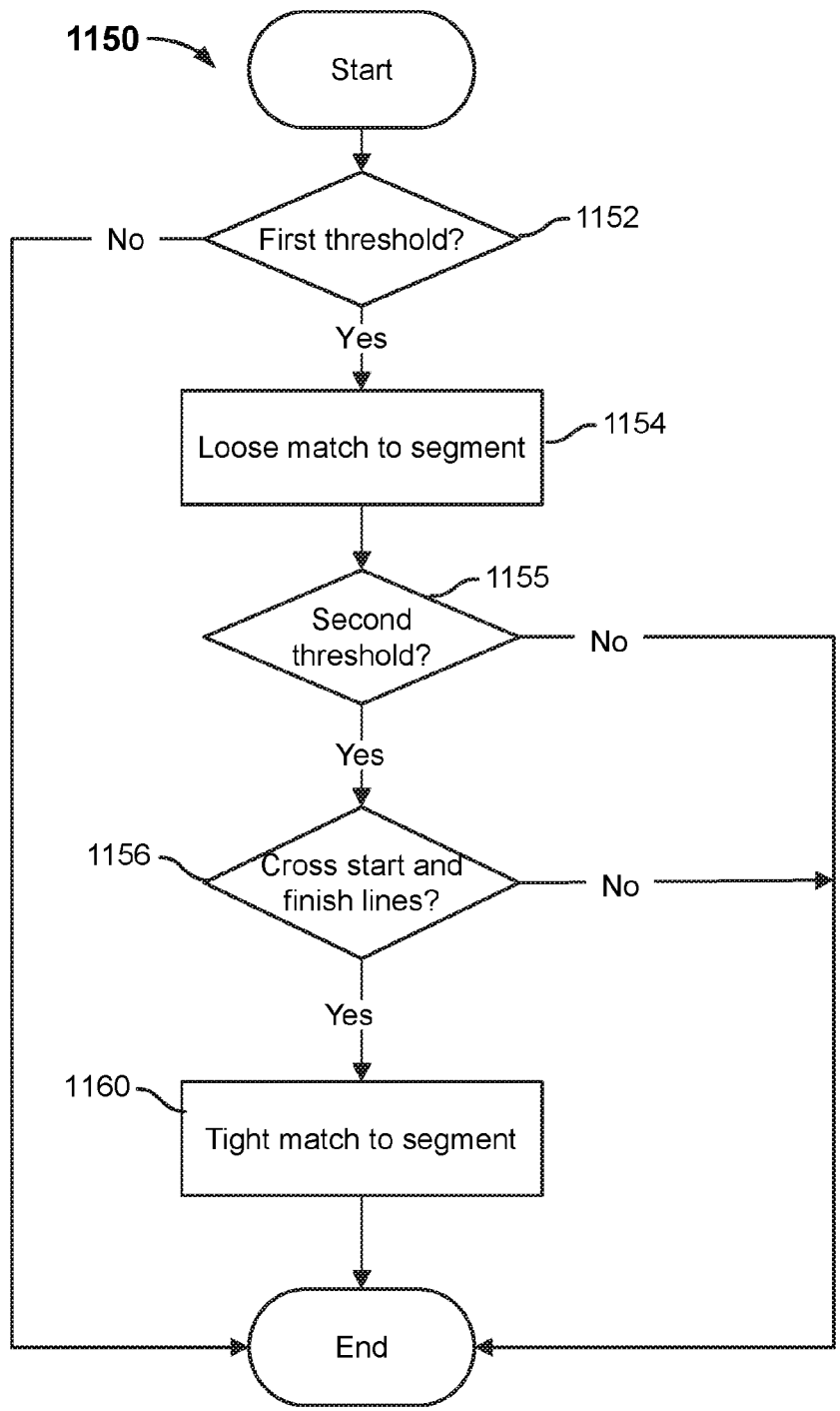
FIG. 11B is a flow diagram showing an embodiment of matching an effort to a segment in accordance with some embodiments.

FIG. 11B is a flow diagram showing an embodiment of matching an effort to a segment in accordance with some embodiments. In some embodiments, process 1150 is used to implement 1106 in accordance with some embodiments.

At the start of process 1150, assume that 1104 has been performed and the query has returned similar portions (e.g., overlapped MBRs or GPS data points that are within a given tolerance) for a segment.

In some embodiments, matching an effort to a segment includes 1152 and ends after 1154 (e.g., determination of a loose match), but not a determination of a tight match. In some embodiments, matching an effort to a segment includes 1155 to 1160 (e.g., determination of a tight match), but not a determination of a loose match. In some embodiments, matching an effort includes both the determination of a loose match and a tight match of an effort to a stored segment.

At 1152, it is determined whether the percentage of match between an effort and the segment exceeds a first threshold. If the percentage of match is below the first threshold (e.g., the percentage of match is below 65%), then the effort is deemed to not match the segment and process 1150 ends. If the percentage of match exceeds the first threshold (e.g., the percentage of match is above 65%), then the effort is deemed to be a loose match to the segment at 1154 and control passes to 1155.

At 1155, it is determined whether the percentage of match between an effort and the segment exceeds a second threshold. If the percentage of match exceeds the second threshold (e.g., the percentage of match is above 80%) then the effort is deemed be a candidate to be a tight match of the segment and control passes to 1156. If the percentage of match is below the second threshold (e.g., the percentage of match is between 65% to 79%), then the effort is deemed not to be a tight match (and only a loose match) and the process ends.

At 1156, it is determined whether the effort crosses the start and finish lines of the segment. If both the start and the finish lines are crossed, then the effort is deemed to be a tight match of the segment at 1160. However, if one or both of the lines are not crossed, then the process ends and the effort is deemed not to be a tight match (and only as a loose match).

In some embodiments, where the effort is being compared to a segment that forms a loop (e.g., a segment that comprises a perimeter around New York City's Central Park), neither a start line nor a finish line are created for the loop segment and so 1156 may not be performed. Instead, in some embodiments, for an effort that has been deemed to be a candidate to be a tight match of the loop segment, an entry point associated with where the effort first crosses the loop segment is first determined. Then, if the effort is determined to cross the determined entry point of the loop segment a second time, then the effort would be deemed to be a tight match of the loop segment.

Figure 12:
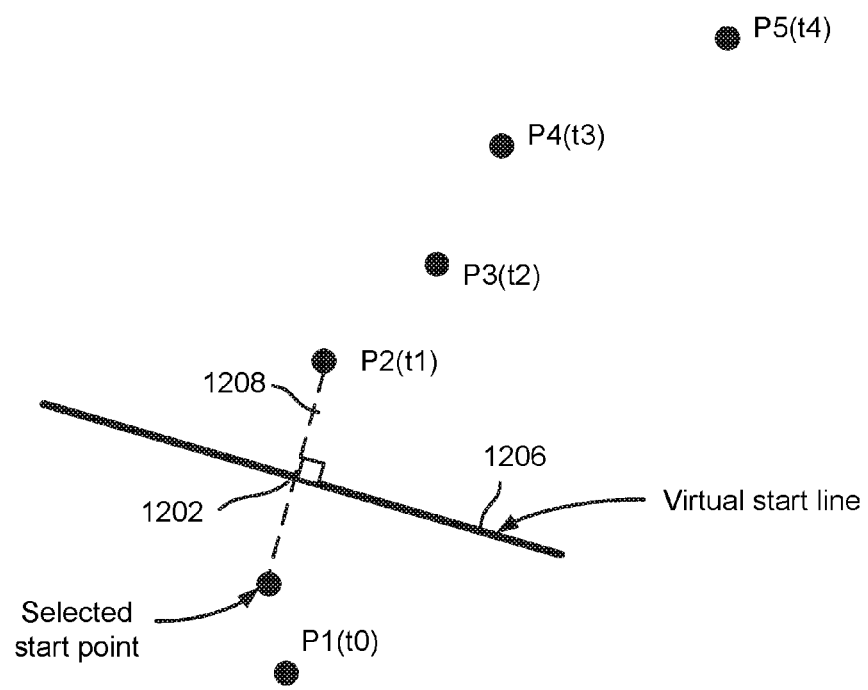
FIG. 12 is a diagram showing an example of creating a virtual start line in accordance with some embodiments.

FIG. 12 is a diagram showing an example of creating a virtual start line in accordance with some embodiments. In some embodiments, a virtual start line is a created for a defined segment. In some embodiments, when a segment is defined using a recorded effort (e.g., by process 400), the virtual start line is derived from the GPS information and the selected start point. In some embodiments, if a segment forms a loop, then neither a start line nor a finish line is created for the segment.

In the example of FIG. 12, the recorded effort is represented by the series of consecutive GPS coordinates P1(t0), P2(t1), P3(t2), P4(t3) and P5(t4). Point P1(t0) was passed earlier in time than P2(t1), and P2(t1) was passed earlier in time than P3(t2), and so forth. The start point is selected at location 1202. The selected start point takes place after P1(t0) was passed but before P1(t1) was also passed. Since the next GPS coordinate of the series is P2(t1) that is not passed, linear path 1208 is drawn from P2(t1) to the selected start point. Virtual start line 1206 is selected to be in a position such that its center crosses with the center of linear path 1208 between the selected start point and P2(t1). In the example, virtual start line 1206 crosses with linear path 1208 at a 90 degree angle, although the two can cross at a different angle as well. The length of virtual start line can be selected to any appropriate length (e.g., 100 meters). In some embodiments, the virtual start line can be stored at the segments database with its associated segment. In some embodiments, the virtual start line can be stored as only the coordinates of the two ends of the line (e.g., because the line can be recreated by drawing a straight line between the two coordinates). In some embodiments, the virtual start line can be stored as a close series of consecutive GPS coordinates along the line.

In some embodiments, a finish line can be created and stored in a similar manner as the previous technique.

In some embodiments, a start (or finish) line is considered to be crossed when the series of GPS information of an effort can be determined to intersect the line. For example, even though a series of GPS information is made of discrete points, if two consecutive points are found to be on different sides of the line, then the associated track is considered to have crossed the line. In some embodiments, if a point in a series is found to be close (e.g., within a given distance) from the line, then an extrapolation of the series of GPS information can be made based on the associated data (e.g., speed, grade, heart rate) that is known about the effort to determine whether if the actual physical activity had cross the virtual line, even if the corresponding recording did not indicate this. For example, some GPS-enabled devices records GPS information at different frequencies than others. As such, some discrepancies may occur between the recorded GPS information depending on the type of recording device used. However, by extrapolating GPS information based on other known data, at least some discrepancies may be compensated for to better ensure that an athlete who has actually crossed a line is given such credit.

Figure 13:
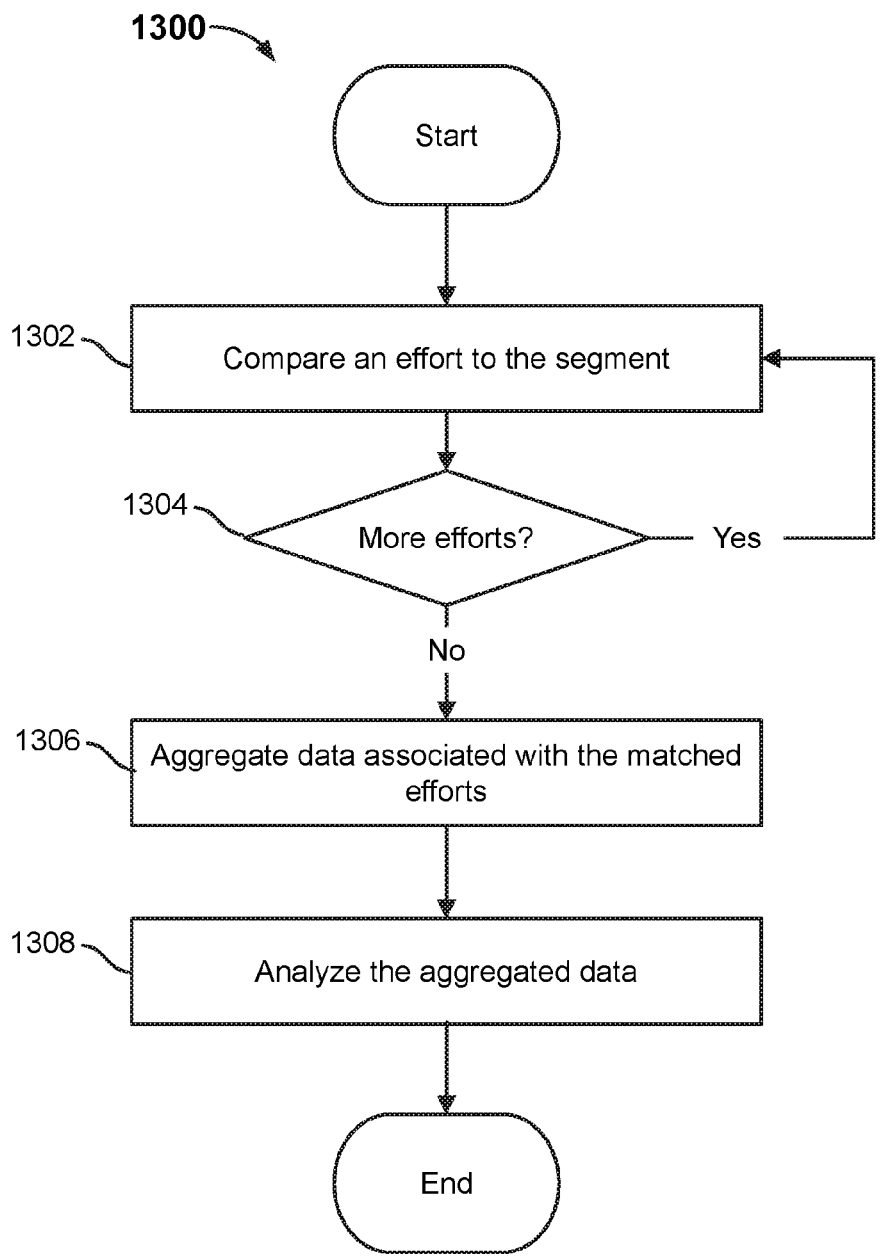
FIG. 13 is a flow diagram showing an embodiment of a process of determining matching efforts in accordance with some embodiments.

FIG. 13 is a flow diagram showing an embodiment of a process of determining matching efforts in accordance with some embodiments.

At 1302, an effort is compared to a segment. In some embodiments, the segment is already defined. In some embodiments, the segment is stored at a database. In some embodiments, the segment is stored as a set of MBRs. In some embodiments, the segment is stored as a series of GPS data points. In some embodiments, the effort is accessed from a database of stored past efforts.

In various embodiments, the effort is compared to a segment to determine to a percentage of match. In some embodiments, the GPS information associated with the effort is accessed (e.g., from a database). In some embodiments, if the segment is stored as a set of MBRs, then the GPS information of the effort is also converted into a set of MBRs and then compared. In some embodiments, if the segment is stored as a set of GPS information, then GPS information of the effort need not be converted.

In some embodiments, if the percentage of match is beyond a threshold, then the effort is deemed to match the segment. In some embodiments, an effort can match a segment at two different levels (e.g., loose match and tight match). If the effort matches a segment at the lower threshold, then it is determined that the effort is a loose match, which implies a lower degree of similarity between geographical tracks of the effort and the segment. If the effort matches a segment at the higher threshold, and additionally, it is determined that the effort crosses both the start and finish lines of the segment (or if the segment forms a loop and it is determined that the effort crosses its entry point at the loop segment for a second time), then it is determined that the effort is a tight match. In some embodiments, a tight match implies a high degree of similarity between the geographical tracks between (at least a portion) of the effort and the segment. In some embodiments, an identifier associated with the effort that matches a segment is stored with the segment. In some embodiments, an identifier for a segment that matches the effort is stored with the effort.

At 1304, it is determined whether there are more efforts to compare to the segment. In some embodiments, all the stored efforts are compared to the segment. In some embodiments, only a subset of the stored efforts is compared to the segment. In some embodiments, all the efforts compared to the segment is associated with one user. In some embodiments, the efforts that are compared to the segment are associated with more than one user.

At 1306, the data associated with the matched efforts are aggregated. In some embodiments, for the efforts that have been deemed to match the segment (e.g., as approximate matches and or close matches), their associated data (e.g., heart, speed, heart rate, power, time) are accessed (e.g., at the efforts database) and aggregated. For example, the aggregated data may be temporarily stored in another database.

At 1308, the aggregated data is analyzed. In some embodiments, calculations are performed using the aggregated data of the matched efforts. For example, the average heart rate, average speed, average time, average power, and/or average grade can be calculated. In some embodiments, the set of associated data for each effort is compared to the sets of associated data for each other effort to create a sorted list of matched efforts (e.g., the list can be sorted based on any one metric of the associated data). For example, a sorted list can include a descending list of efforts with the fastest time. Or, in another example, a sorted list can include an ascending list of efforts with the highest power. For example a sorted list can include a list of the most recently recorded efforts. In some embodiments, the analysis of the aggregated data can be displayed (e.g., at a user interface). The display can include tables and/or visuals.

FIG. 14 is a diagram showing an example of a display of analyzed data for matched efforts in accordance with some embodiments. In some embodiments, the example of FIG. 14 is displayed for a selected segment for which matching efforts have been determined. Put another way, each effort that has been matched to the segment implies that each effort has been deemed to have traversed the geographical track referenced by the segment. The example of FIG. 14 can be displayed at a user interface (e.g., at a device). In the example, the physical activity associated with the efforts is cycling so each effort is referred to as a ride. Section 1402 includes a list of the most recent rides including the users, times, heart rates, power and time. Section 1404 includes a list of rides sorted by time, where the fastest time to complete the segment is listed first. The list of section 1402 is an example of a "leader board."

By defining a geographical track as a segment, it can be easily referenced for comparisons of athletic performance over the track. In some embodiments, a user can define a segment at a user interface using recorded GPS data from his or her own physical activity. In some embodiments, a user can define a segment at a user interface by making selections on a map. However a segment is defined, once it has been defined, a stored history of athletic performance (e.g., efforts) can be accessed to match the segment. The associated data of the matching efforts can be aggregated and presented in a table or visual that represents all or a subset of all athletic performance associated with the segment. In some embodiments, the same user or another user can subsequently check if his or her recorded activity included or matched a defined segment. In this subsequent check, the user can benefit from the automatic match of his or her recorded activity against defined and stored segments, without needing to know exactly where a segment begins or ends.

Using traditional systems, analysis based on an user's GPS location and other data points for the user is not capable of supporting real-time feedback comparisons with other users during the performance of a physical activity because such analyses have previously not been calculable until the GPS device of the user can be connected to a computer Providing real-time feedback for a current activity associated with a segment is disclosed. In various embodiments, the defined and stored segments can be used to generate feedback in real-time for a user while the user is performing a current activity (e.g., cycling, running) that matches one or more segments. In some embodiments, "real-time" includes providing feed-back or communication to a user at a device while the user is still progressing along a current activity (i.e., the feedback is provided to a user while the current activity is ongoing). In various embodiments, feedback is provided to the user during the user's current activity without requiring an input by the user requesting for the feedback. Instead, parameters can be configured by the user or by default settings at the device that indicate when, in response to which event, what type of content, and so forth, feedback is to be provided during an activity of the user. Examples of types of feedback can include comparisons of the user's current performance so far on the matched segment versus the user's own historical performance data or other users' historical performance data on the segment, detection of nearby users and/or segments, and indications of the user's personal achievement with respect to the user's performance on the segment so far. As a result, the user can enjoy feedback based on the user's current performance on the matched segment(s) as well other information regarding the matched segments without needing to actively initiate segment matching/discovery or comparisons, etc., as the user is currently in the middle of performing an activity. For example, during a physical activity, a user may not have the interest or it may not be practical for the user to manually initiate the reception of feedback regarding the user's current activity.

Figure 15:
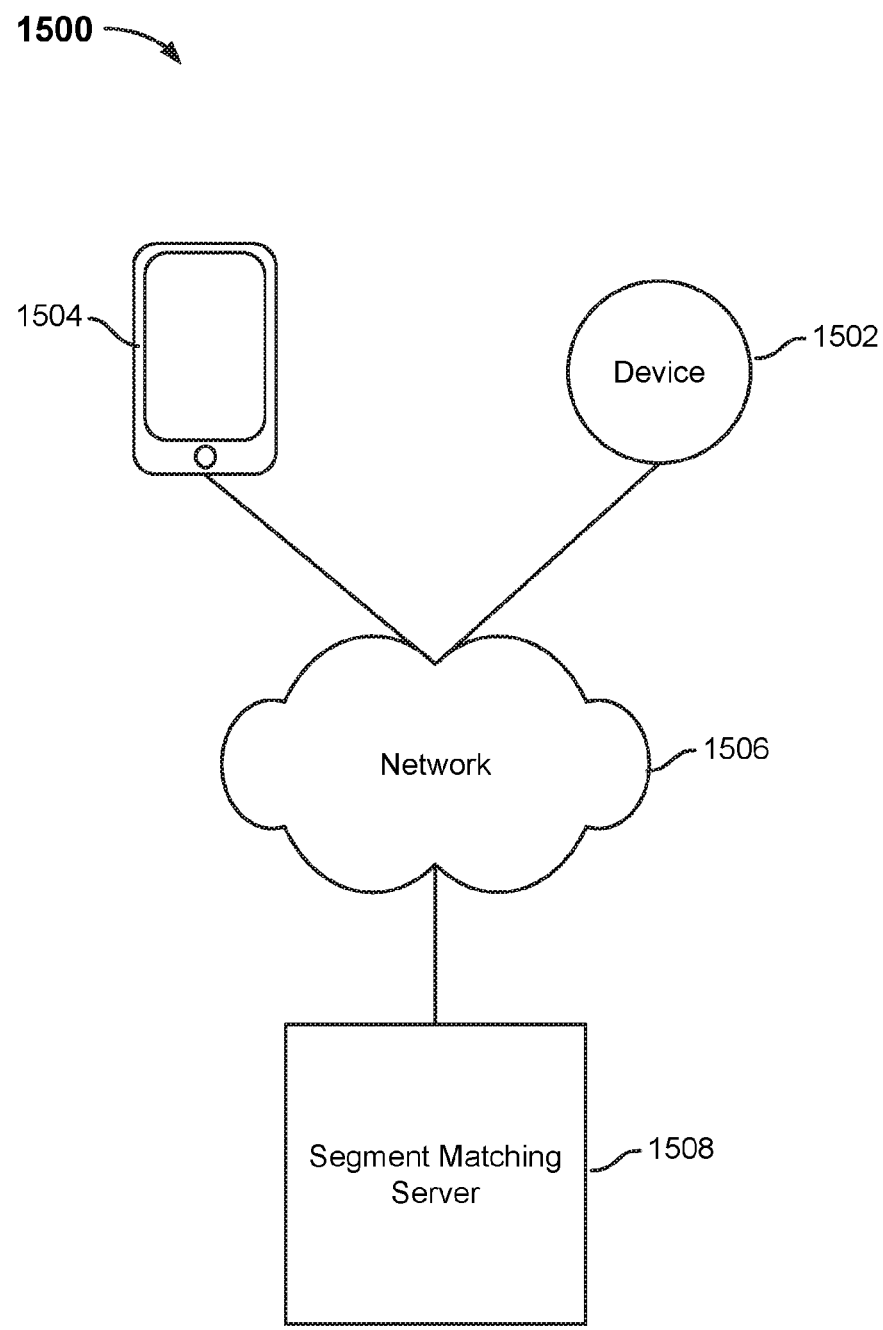
FIG. 15 is a diagram showing an embodiment of a system for providing real-time feedback during a current activity associated with a segment in accordance with some embodiments.

FIG. 15 is a diagram showing an embodiment of a system for providing real-time feedback during a current activity associated with a segment in accordance with some embodiments. In the example, system 1500 includes device 1502, device 1504, network 1506, and segment matching server 1508. Network 1506 includes various high-speed data networks and/or telecommunications networks. In some embodiments, system 1500 includes at least the components of system 200 in addition to further components and/or functionalities.

In some embodiments, a user can bring one or both of device 1502 and device 1504 with him or her while the user is performing a physical activity. For example, either or both devices can be worn on the user's body (e.g., strapped to a user's arm) or attached to a vehicle (e.g., such as a bicycle) that is employed by the user during the physical activity.

Either one of both of device 1502 and device 1504 can record location information (e.g., GPS data) and/or other data associated with a physical activity (e.g., speed, heart rate). Examples of device 1502 and/or device 1504 include a GPS device (e.g., Garmin Forerunner and Edge devices, including Garmin Forerunner 110, 205, 301, 305, 310XT, 405, 405CX, and Garmin Edge 305, 605, 705, 500), a mobile phone, such as a smart phone (e.g., an Android based device or Apple iPhone device) including a GPS recording application (e.g., MotionX, Endomondo, and RunKeeper), a computer, a tablet device, and/or other general purpose computing devices and/or specialized computing devices, which typically include a general processor, a memory or other storage component(s), a network or input/out (I/O) capability, and possibly integrated GPS functionality or support or an interface for a GPS device or GPS functionality.

In some embodiments, device 1502 does not include the functionality to send and receive data over network 1506 to a remote server such as segment matching server 1508 but does include the functionality to communicate device 1504. For example, device 1502 can communicate with device 1504 using a close range protocol for wireless communication such as Bluetooth or otherwise, using a wired connection. In such embodiments, device 1504 does include the functionality to send and receive data over network 1506 to segment matching server 1508. As such, device 1502 can send and receive data from segment matching server 1508 via device 1504. For such embodiments, device 1502 can be a non-networked device that records a user's location information and/or other data associated with a physical activity and then sends the recorded information to device 1504. For example, device 1504 can be a networked device such as a smart phone or a tablet device that can receive the recorded information from device 1502 (e.g., using an installed application) and can in turn send the recorded information to segment matching server 1508. Furthermore, information that is sent from segment matching server 1508 (e.g., feedback data) is received by device 1504 and then sent to device 1502.

In some embodiments, device 1502 does include the functionality to send and receive data over network 1506 (i.e., device 1502 is a networked device) and device 1504 is optionally included in the system. In embodiments where device 1502 can record location information and/or other data associated with a physical activity and also send and receive data over network 1506, device 1502 can send, for example, recorded information to segment matching server 1508 and receive, for example, analyses of recorded information from segment matching server 1508 without the aid of device 1504.

While more than one device can be used to record information associated with a physical activity and communicate with segment matching server 1508 (such as the combination of device 1502 and device 1504 as described in the example above), for illustrative purposes, using only one device, device 1502 with network-ready capabilities, to record information and communicate with segment matching server 1508 is described in the figures and descriptions below.

In various embodiments, device 1502 (or an application thereof) is configured to record location information (e.g., GPS data) and/or other data associated with a physical activity during a user's performance of the physical activity. In some embodiments, a physical activity in which a user is currently participating is referred to as a "current activity." Examples of a physical activity include cycling, running, and skiing. In some embodiments, GPS information includes a series of consecutive and discrete GPS data points (e.g., longitudinal and latitude coordinates) with a timestamp for each point. In some embodiments, associated data includes, but is not limited to, elevation, heart rate, power/watts (e.g., energy expended), time, speed (e.g., average and/or maximum speed per segment and/or route, in which average speed, for example, can be derived from time and GPS information), and/or cadence. In some embodiments, at least a portion of the associated data is referred to as "performance data." Associated data can be recorded at various granularities. For example, associated data can correspond to each GPS data point, the entire activity (e.g., the associated data includes averages of the metrics), or portions of the activity.

In some embodiments, prior to using device 1502 on a physical activity, parameters of device 1502 (or a user's account associated with an application at device 1502) are configured to determine the manner in which device 1502 is to send and receive data from segment matching server 1508 before or during a physical activity. The parameters of the device 1502 (or a user account associated with an application at device 1502) can be configured by a user and/or by preset settings. In some embodiments, parameters associated with device 1502 can be configured to determine which data is to be received from segment matching server 1508 at device 1502 before a user begins a physical activity. In some embodiments, parameters can filter out data that is not of interest to the user or identify the types of data that are of interest to the user. For example, data obtained from segment matching server 1508 before a physical activity can be stored locally (e.g., cached or otherwise temporarily stored) at device 1502 and used to process information recorded by device 1502 during the physical activity. In some embodiments, parameters associated with device 1502 can be configured to determine when (e.g., at what frequency) and which type of data is sent to or received from segment matching server 1508 during a physical activity. The parameters associated with either a device and/or user can be configured at device 1502 and/or elsewhere and downloaded to device 1502, for example. A copy of the configured parameters, in some embodiments, is also sent to and maintained at segment matching server 1508. For example, data to be sent from device 1502 during a physical activity can include recorded GPS data and other data associated with the user's current activity so far. Also for example, data to be received at device 1502 from segment matching server 1508 includes various types of real-time feedback data that is based at least in part on processing the recorded GPS data and other data sent from device 1502. In some embodiments, as device 1502 continuously (e.g., periodically) sends new and/or updated recorded information to segment matching server 1508 and segment matching server 1508 can continuously send updated feedback data back to device 1502. In some embodiments, the feedback data includes one or more segments that the recorded information associated with the user's current activity are determined to match or are determined to be proximate to. In some embodiments, the feedback data includes comparison results between the user's performance in the current activity with historical or concurrent performance information (e.g., of the user's or of other users') stored for the one or more segments for which the user's current activity are determined to match. In some embodiments, the feedback data includes alerts and invitations associated with concurrent activities of other users and/or personal achievements indications for the user. Feedback data types other than the ones described above may be received at device 1502. In some embodiments, at least a portion of the received data (e.g., feedback data) at device 1502 is presented to the user in real-time in a graphic, textual, and/or audio visual manner. For example, a user interface at device 1502 can display a comparison result from the feedback data while an audio output of device 1502 can output an audio articulation of the comparison result.

In various embodiments, segment matching server 1508 includes the functionalities of segment matching server 106 but also additional functionalities. In some embodiments, segment matching server 1508 is configured to determine whether GPS data received from device 1502 matches one or more defined segments. For example, segment matching server 1508 can determine that the received GPS data matches a segment based on a determination that at least a portion of the GPS data received from device 1502 so far crosses at least a portion of the segment (e.g., the GPS data indicates that the user in the current activity has crossed a designated start line associated with the segment). In some embodiments, when it is determined that the location information recorded for a user's current activity matches a segment, it is presumed that the user is on (i.e., traveling along) the matched segment. In some embodiments, once a matching segment is determined, segment matching server 1508 is configured to retrieve stored historical or concurrent performance data associated with the matched segment to use to compare against the current performance data received from device 1502 based on the user's current activity. Segment matching server 1508 is configured to send at least a portion of the comparison results to device 1502 as part of feedback data. In some embodiments, segment matching server 1508 is configured to generate other types of feedback (e.g., alerts and invitations associated with concurrent activities of other users and/or personal achievements indications for the user data) based at least in part on the segment(s) matched to the received GPS data on the user's current activity so far. In some embodiments, segment matching server 1508 is configured to perform segment matching and/or generate feedback data for a user based on configured parameters associated with that user. In some embodiments, segment matching server 1508 is configured to update its generated feedback data based on updated GPS data and other data associated received from device 1502 over time.

Figure 16:
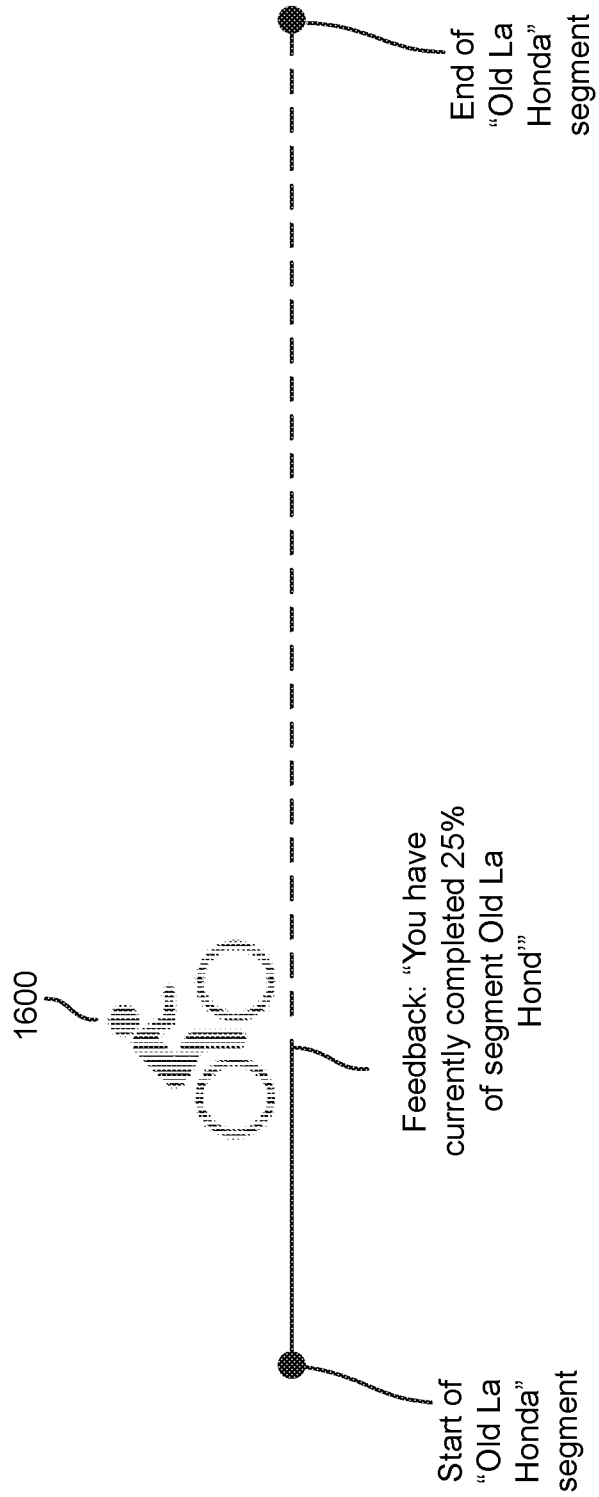
FIG. 16 is a diagram showing a user performing using system 1500 while performing an activity in accordance with some embodiments.

FIG. 16 is a diagram showing a user performing using system 1500 while performing an activity in accordance with some embodiments. In the example, user 1600 is performing a cycling activity. Assume that user 1600 is using device 1502 of system 1500 as user 1600 is cycling. Prior to beginning the activity, user 1600 has already configured parameters of device 1502 with respect to sending data and receiving feedback data from a remote server or generating feedback locally at the device during an activity, to conform with the segments, other users, type of comparisons, etc, based on the user's interests. As user 1600 cycles along a path, user 1600 does not need to know if he or she is traversing along a segment or where a segment is located relative to user 1600's cycling path. However, by virtue by using device 1502, user 1600 can be presented feedback at device 1502 during user 1600's activity. For example, as shown in the diagram, user 1600 can be presented feedback data at device 1502 that indicates which segment user 1600 is currently riding on ("Old La Honda") and where user 1600 currently is along in the segment ("You have completed 25% of segment 'Old La Honda'"). User 1600 can receive updated feedback and other types of feedback data (e.g., "You are riding at your lowest heart rate on 'Old La Honda' ever!") continuously (e.g., periodically and/or at configured events) as user 1600 progresses along the segment, without needing to initiate or query for feedback during the activity. Feedback that user 1600 receives during the physical activity can, sometimes, motivate or otherwise cause user 1600 to change his or her performance along the remainder of the segment. For example, if user 1600 receives a feedback such as "You are just 3 seconds ahead of the leader of Old La Honda," then user 1600 could be motivated to ride faster to catch up with or surpass the leader of the segment, if that is user 1600's goal. As shown in the example, the use of system 1500 during a user's current activity can help inform the user, in real-time, information regarding the user's performance that the user might have otherwise not known until after the completion of an activity.

Figure 17:
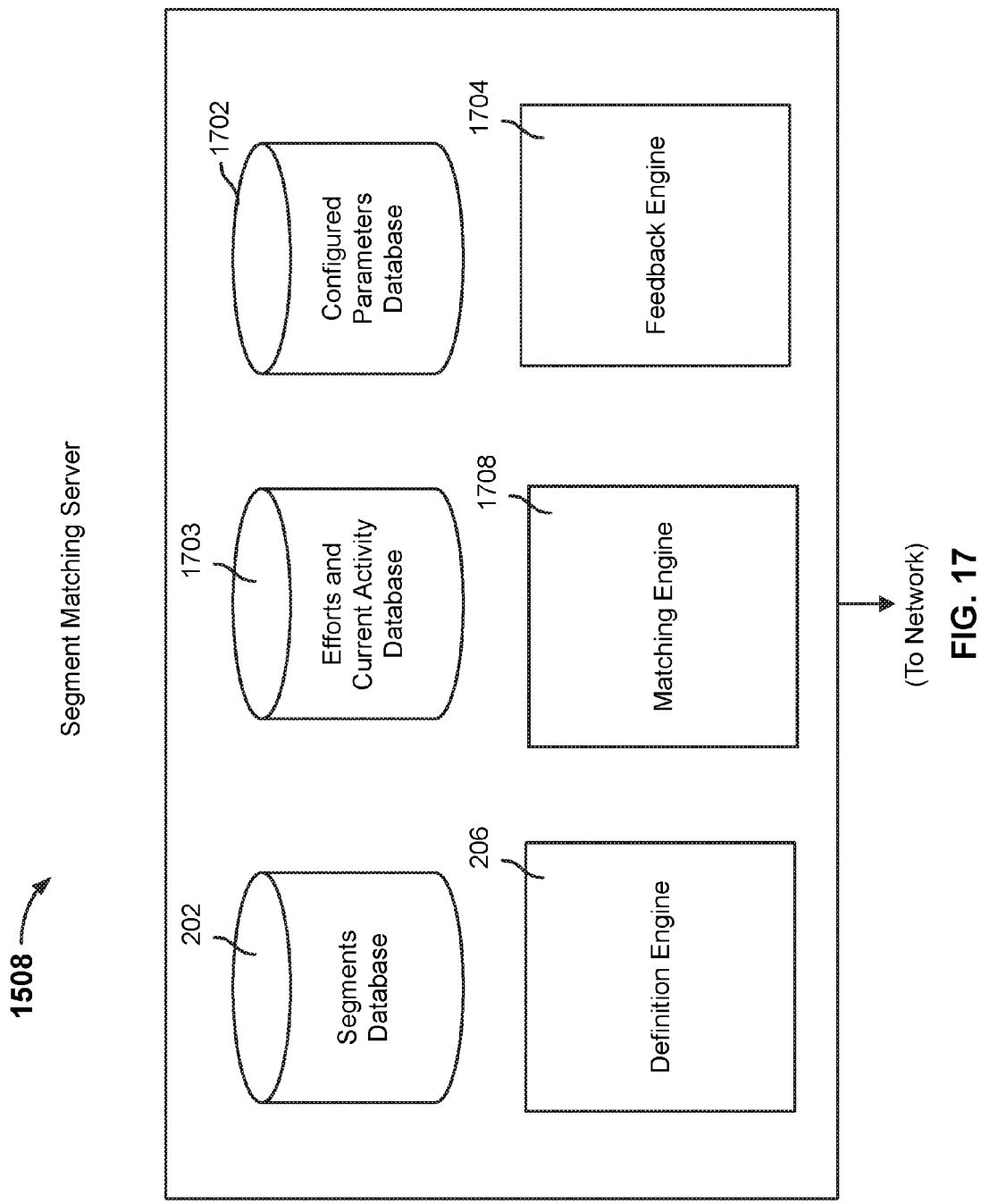
FIG. 17 is a diagram showing an embodiment of a segment matching server in accordance with some embodiments.

FIG. 17 is a diagram showing an embodiment of a segment matching server in accordance with some embodiments. In some embodiments, segment matching server 1508 is implemented with the example of FIG. 17. As shown in the example, segment matching server 1508 includes some of the same components (segments database 202 and definition engine 206) as segment matching server 106 as described above but also includes additional components such as configured parameters database 1702, feedback engine 1704, efforts and current activity database 1703, and matching engine 1708.

In some embodiments, configured parameters database 1702 is configured to store sets of configured parameters associated with various devices and/or users. In some embodiments, a set of parameters associated with the manner in which data (e.g., recorded GPS data and associated data) is to be sent to segment matching server 1508 and the manner in which data (e.g., feedback) is to be received from segment matching server 1508 is configured by a user for the particular user and/or a particular device. In some embodiments, a set of parameters includes user configured parameters and also preset parameters (e.g., parameters that are determined by the manufacturer of a device such as device 1502). Examples of parameters can include if and when data associated with a segment is to be downloaded to a device, identifiers associated with segments that a particular user is interested in, identifiers associated with other users whose performance data (e.g., historical or concurrent) that the particular user is interested in comparing the user's own performance to, types of comparisons between the user's performance data associated with a current activity and another set of performance data, the frequency at which recorded GPS and other data is sent from the device, one or more triggers to send recorded GPS and other data to be sent from the device, a degree of interest associated with the conservation of battery life of the device, which types of personal achievements that the user is interested in, if and when performance of the particular user should be shared at one or more social media/network platforms, and a definition of a window of time associated with concurrency between multiple users (e.g., the definition indicates a window of time or distance in which at least two users participating in physical activities are considered to be concurrent with one another). In some embodiments, a set of parameters is stored with an identifier associated with the user and/or device for which it is configured.

In some embodiments, efforts and current activity database 1703 includes the functionalities of efforts database 204 but also additional functionalities. In some embodiments, in addition to the storing data of recorded efforts as described for efforts database 204, efforts and current activity database 1703 also stores the GPS data and associated data recorded for current activities (i.e., ongoing activities) of users. In various embodiments, the GPS data and associated data recorded for a user's current activity is refreshed and/or added to with new and/or updated GPS data and associated data recorded for that user's current activity over time as the user progresses further along in that current activity. For example, during user Barry's current running activity, the GPS data and associated data recorded by time t0 can be sent to segment matching server 1508 and stored at an entry of efforts and current activity database 1703. Then, the GPS data and associated data recorded by later time t1 for Barry's current running activity (or only the data recorded after time t0 until time t1) is sent to segment matching server 1508 and added to the corresponding entry of efforts and current activity database 1703.

In some embodiments, matching engine 1708 includes the functionalities of matching engine 208 but also additional functionalities. In some embodiments, matching engine 1708 is configured to continuously (e.g., periodically and/or at various configured trigger events) receive new or updated GPS data and other data recorded at a device such as device 1502 over time as a user progresses in a physical activity. In some embodiments, matching engine 1708 uses the GPS data received from a device so far to determine whether the GPS data traverses at least a portion of one or more defined segments. For example, matching engine 1708 can make a determination that the GPS data recorded for a current activity matches a segment (meaning that the user is on the path of the segment or very near to the segment) if the GPS data indicates that at least a portion the recorded GPS data has crossed the virtual start line that has been defined for the segment. Defining a virtual start line for a segment and determining whether the virtual start line has been crossed can be performed using the technique described above with FIG. 12, for example, where instead of using GPS information associated with a recorded effort, the GPS data recorded for the current activity so far is used to determine whether two consecutive points have found to be on different sides of the virtual start line. If so, then the current activity is determined to have crossed the virtual start line of a segment and therefore, the current activity is determined to match that segment. In another example where the segment forms a loop, then instead of defining a virtual start line for the loop segment, GPS data recorded for the current activity can be used to determine whether the current activity has entered the loop (e.g., by at least having crossed at least a portion of the loop segment). If the GPS data recorded for the current activity is determined to have crossed at least a portion of the loop segment, then the current activity is determined to match that loop segment. In some embodiments, one or more segments can be found to match the GPS data recorded for a current activity. In some embodiments, as more new and/or updated GPS data recorded for a current activity is received over time, matching engine 1708 can use the new and/or updated GPS data to determine whether the GPS data associated with the user's current activity still matches (i.e., the user is still on the path associated with) a segment that the current activity was previously determined to match. If it is determined that the user's current activity still matches the segment, then matching engine 1708 can determine how far the user is along the segment. For example, based on the GPS data recorded for the user's current activity received so far, matching engine 1708 can determine that a user has completed 70% of the segment. In some embodiments, matching engine 1708 is configured to use a set of configured parameters (retrieved from configured parameters database 1702) associated with the user currently performing an activity to determine the one or more segments identified by the user as segments that he or she is interested in matching. Then, matching engine 1708 can match the GPS data of the user's current activity with only those segments of interest to the user, rather than against of all available/defined segments in the database. In some embodiments, matching engine 308 is configured to send identifiers associated with the matched segment(s) to feedback engine 1704.

Feedback engine 1704 is configured to use a set of configured parameters associated with a user and data associated with at least a segment matched by a user's current activity to determine the type of feedback data to send to a device used by the user. In some embodiments, feedback engine 1704 retrieves the set of configured parameters associated with an identifier of the user from configured parameters database 1702. In some embodiments, feedback engine 1704 receives an identifier associated with a segment that matches the user's current activity from matching engine 1708. In some embodiments, using the received identifier associated with the matched segment, feedback engine 1704 is configured to retrieve historical data associated with efforts of the user and/or other users that also matched that segment from efforts and current activity database 1703. In some embodiments, feedback engine 1704 is configured to retrieve concurrent data associated with current activities of other users that also matched that segment from efforts and current activity database 1703. For example, the data of current activities of other users can be determined as being concurrent to the user based on a definition for concurrency in the retrieved set of configured parameters. In some embodiments, feedback engine 1704 uses the retrieved set of configured parameters to determine at least which subset of the retrieved data associated with the matched segment that the user is interested in comparing the associated data (or sometimes referred to as performance data) of the user's current activity against. For example, the user's configured parameters can indicate that the user wishes to compare the user's performance data associated with the user's current activity with the historical or concurrent performance data of his friends Carrie, Daniel, and Eric on the matched segment. In some embodiments, feedback engine 1704 can use the retrieved set of configured parameters to determine which types of comparisons are to be generated with the retrieved historical and/or concurrent data. For example, the user's configured parameters can indicate that the user wishes to receive feedback data associated with a leader board that includes his own performance data as well as the performance data associated with his friends of Carrie, Daniel, and Eric. In some embodiments, feedback engine 1704 is configured to send alerts associated with detecting a segment and/or another user that the user is interested in (as indicated in the retrieved set of configured parameters) as being nearby. In some embodiments, feedback engine 1704 is configured to communicate to a third party operated social network to post an indication on the social network's platform associated with a certain performance of the user that the user has attained in a current activity and/or updated progress reports of the user's current activity. In some embodiments, feedback engine 1704 can also be configured to provide feedback data other than the types described above.

In some embodiments, device 1502 may store at least some portion of segments database 202, definition engine 206, efforts and current activity database 1703, matching engine 1708, configured parameters database 1702, and feedback engine 1704 or equivalent functionalities such that device 1502 can provide real-time feedback at device 1502 without needing to send or receive information from segments matching server 1708 during an activity of a user. In some embodiments, device 1502 pre-fetches and locally stores segment data from segment matching server 1508 prior to a physical activity is performed by a user such that during the performance of the activity, feedback data (e.g., that involve at least a matched segment) can be generated based on the pre-fetched data.

Figure 18:
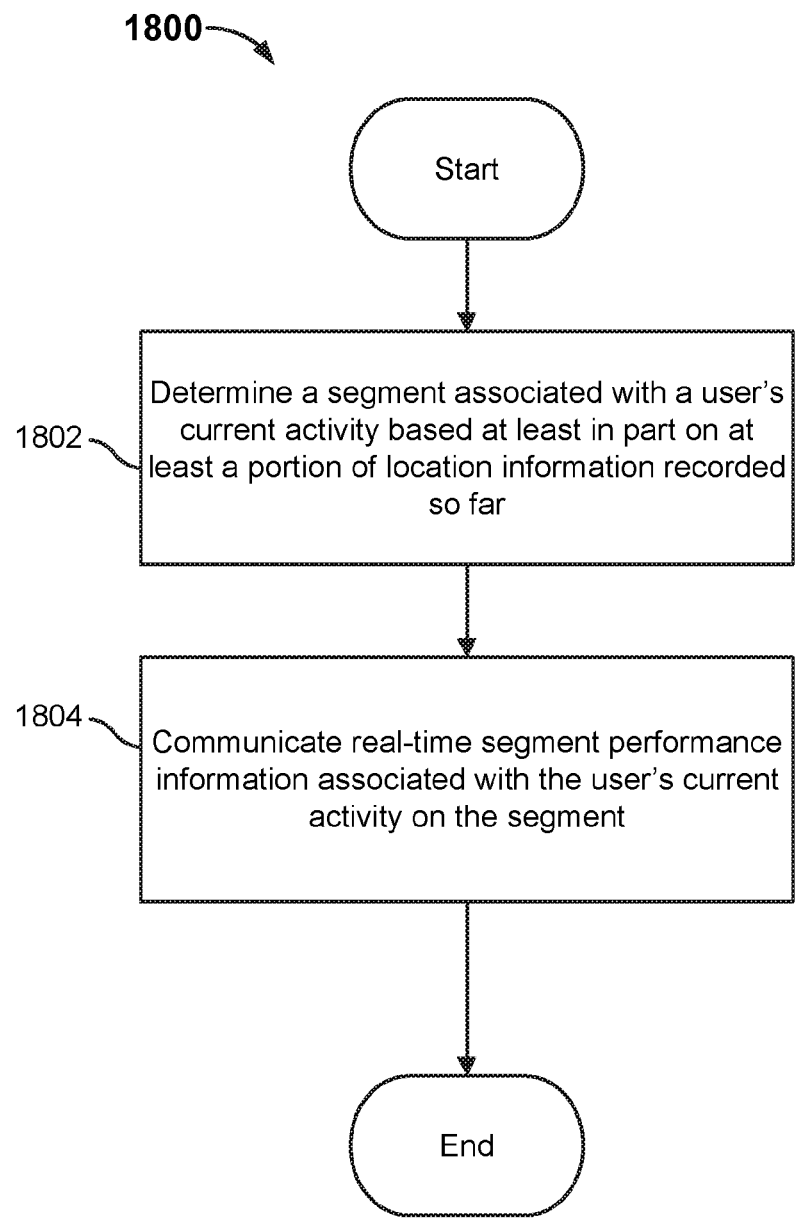
FIG. 18 is a flow diagram showing an embodiment of a process for providing real-time feedback during a current activity associated with a segment in accordance with some embodiments.

FIG. 18 is a flow diagram showing an embodiment of a process for providing real-time feedback during a current activity associated with a segment in accordance with some embodiments. In some embodiments, process 1800 is implemented at system 1500. In some embodiments, process 1800 is implemented at device 1502 of system 1500.

At 1802, a segment associated with a user's current activity is determined based at least in part on at least a portion of location information recorded so far. In some embodiments, location information (e.g., GPS data) is recorded for a user's current activity (e.g., cycling or running) during the user's performance of the activity. In some embodiments, associated data of the user's current activity is also recorded during the user's performance of the activity. At least a portion of the associated data (e.g., speed, heart rate, power/watts, cadence) is associated with the user's performance during the current activity. Over time, more GPS data and associated data are recorded for the user's current activity. At some point during the user's current activity, at least a portion of the recorded GPS data is used to determine a segment associated with the user's current activity. In some embodiments, the segment associated with the user's current activity is one which at least a portion of the location information recorded so far for the user's current activity matches.

At 1804, real-time segment performance information associated with the user's current activity on the segment is communicated. In some embodiments, the type and manner of performance information to be communicated is determined based on a set of configured parameters associated with the user and/or or a device from which the location information was generated. In some embodiments, once a segment is determined (e.g., through segment matching), data stored associated with that segment is retrieved. In some embodiments, the retrieved data can include historical performance data on the associated (e.g., matched) segment of users (including the user performing the current activity and other users) and concurrent performance data on the associated segment of other users currently on the segment. In some embodiments, the performance data recorded for the user's current activity on the determined segment so far is compared to corresponding portions of the retrieved data associated with the determined segment and the results of the comparisons comprise performance information that is communicated. For example, comparison results can be generated by comparing the historical performance data of the user on the determined segment to the performance data of the user's current activity on the segment. In some embodiments, the performance information includes a current progress of the user along the segment and is determined based at least in part on the location information recorded so far and data identifying the geographic points along the segment. In some embodiments, performance information includes an indication associated with a personal achievement attained based on the recorded location information and associated data for the user's current activity. In some embodiments, performance information (alternative or in addition to other information) associated with the user's current activity on the determined segment is communicated through a display or an audio and/or visual output of a user interface (e.g., at the device from the location information and associated data was generated).

In some embodiments, information associated with segments proximate to/nearby the current location of the user's current activity is also communicated. In some embodiments, a segment that is nearby or proximate to a user's current location comprises a segment that does not match the user's current activity but is within a designated proximity to the user's current location. For example, the user may be interested in being recommended segments close to (e.g., within a designated proximity such as within a 10 miles radius of) the user's current location and/or the segment that the user is currently progressing along. Notifying the user of nearby segments can help the user discover segments that the user did not know existed or did not know that existed nearby to the user's current location. In some embodiments, parameters of a filter for detecting/notifying/recommending a user regarding nearby segments can be configured such that only segments that fit one or more criteria are detected and recommended to the user. For example, criteria associated with detecting nearby segments can include one or more of the following: segments within a certain proximity to a user's current location, segments that are indicated by the user to be of interest, segments that are determined to be similar (e.g., based on geographic, distance, elevation, and/or other criteria) to segments that are indicated by the user to be of interest, and/or segments that are determined to be popular among one or more other users. In some embodiments, detection of nearby segments can be performed periodically and/or at other events throughout a user's current activity because as the user performs the current activity, his or her current location also changes. For example, as the user progresses along a current activity, he or she may enter new and/or different geographic areas in which different sets of nearby segments can be detected and recommended for the user. In some embodiments, an event can be configured such that at the occurrence of each such event during the user's current activity a determination of nearby segments can be made based on the configured criteria and the user's updated current location. For example, the event can be a time period of 10 minutes since the previous determination or a distance of 5 miles traveled since the previous determination.

Figure 19:
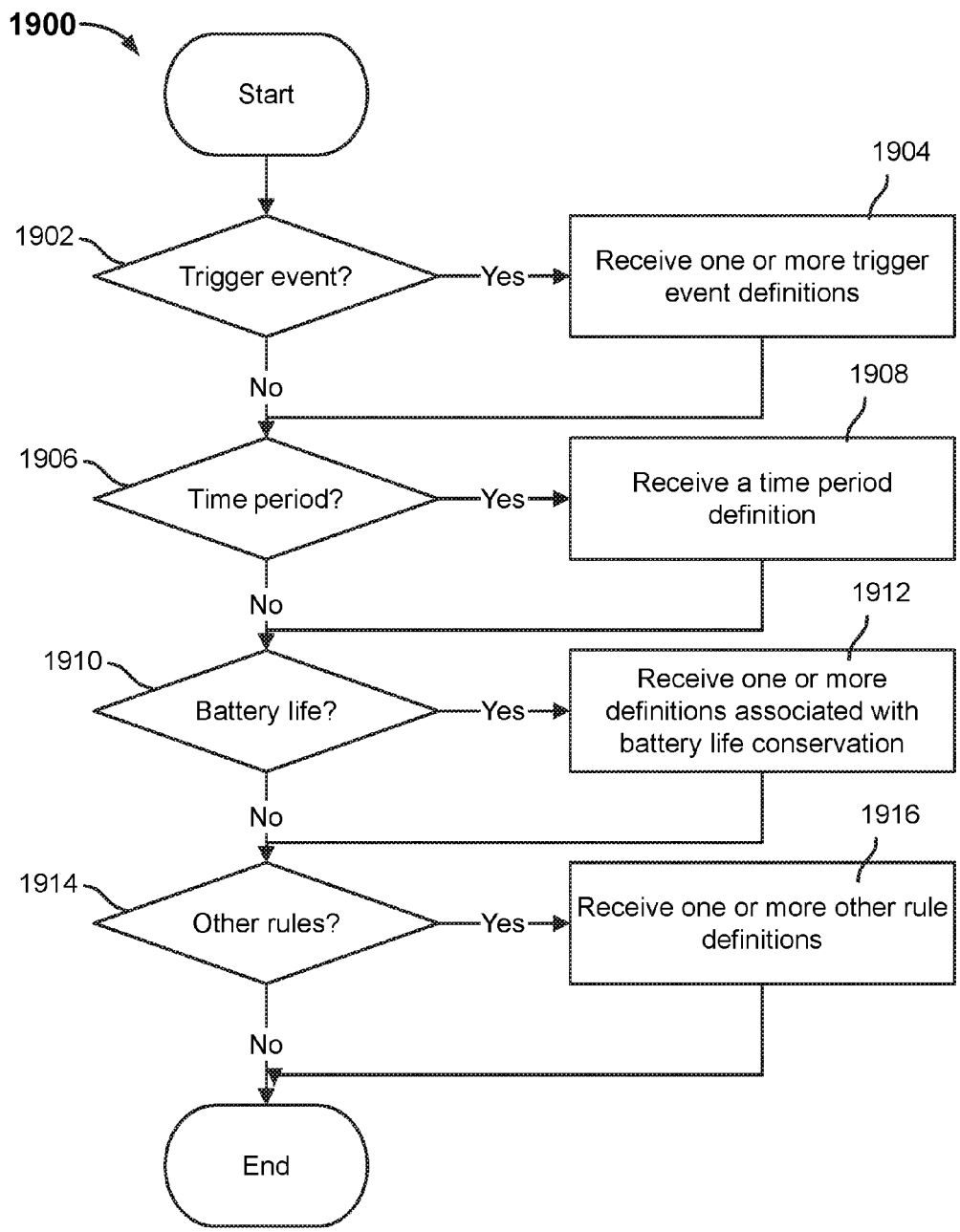
FIG. 19 is a flow diagram showing an embodiment of a process for configuring parameters associated with sending information recorded at a device to a remote segment matching server in accordance with some embodiments.

FIG. 19 is a flow diagram showing an embodiment of a process for configuring parameters associated with sending information recorded at a device to a remote segment matching server in accordance with some embodiments. In some embodiments, process 1900 is implemented at system 1900. In some embodiments, process 1900 is implemented prior to a performance of process 1800.

Process 1900 can be used to configure parameters associated when recorded GPS data and associated data (e.g., performance data) are to be sent from the device at which it was recorded to a segment matching server such as segment matching server 1508 so that the server can perform analysis on the received data. In some embodiments, the selections of process 1900 can be input by a user at a user interface associated with a device such as device 1502. In some embodiments, the parameters configured with process 1900 can be stored and used during a user's activity. In some embodiments, the parameters for data transmission can include more or fewer than those shown in the example. In some embodiments, based on the configured parameters, the frequency at which the device sends recorded data to the segment matching server can be dynamic throughout the user's current activity. In some embodiments, if the configured parameters of data transmission define more frequent transmissions of data, the returned results of analysis of the data (i.e., the feedback data) from the server may be more frequent/nuanced but would incur greater device power consumption. However, less frequent transmissions of data could entail fewer/less frequent feedback data from the server but incur less device power consumption.

At 1902, it is determined whether an event that triggers the transmission of data is to be configured. In the event that a trigger event is to be configured, control passes to 1904. Otherwise, control passes to 1906. At 1904, definitions of one or more trigger events are received. For example, a trigger event can be associated with a pause in the user's current activity that could indicate that the user is taking a break and/or something abnormal is occurring with respect to the user's current activity.

At 1906, it is determined whether the transmission of data is to occur on a periodic basis. In the event that the data is to be transmitted on a periodic basis, control passes 1908. Otherwise, control passes to 1910. At 1908, a time period definition is received. For example, a time period can be that data is sent to the server every 10 seconds.

At 1910, it is determined whether the transmission of data depends on a degree of interest associated with the conservation of battery life of the device. In the event that the transmission of data is to depend on a degree of interest associated with the conversation of battery life, control passes to 1912. Otherwise, control passes to 1914. At 1912 one or more definitions associated with battery life conservation are received. For example, several levels of interest in conserving battery life (e.g., ranging from a strong desire to save battery life to a low interest for saving battery life) of the device can be defined with corresponding settings for the frequency at which recorded data is sent to the server. So, for example, a strong interest in conserving battery life could be associated with a relatively infrequent basis for sending data to the server whereas a low interest in conserving battery life could be associated with a relatively frequent basis for sending data to the server.

At 1914, it is determined with other rules are to be set. In the event that other rules are to be set, control passes 1916. Otherwise, process 1900 ends. For example, rules other than the examples described at 1902, 1906, and 1910 can be defined.

Figure 20:
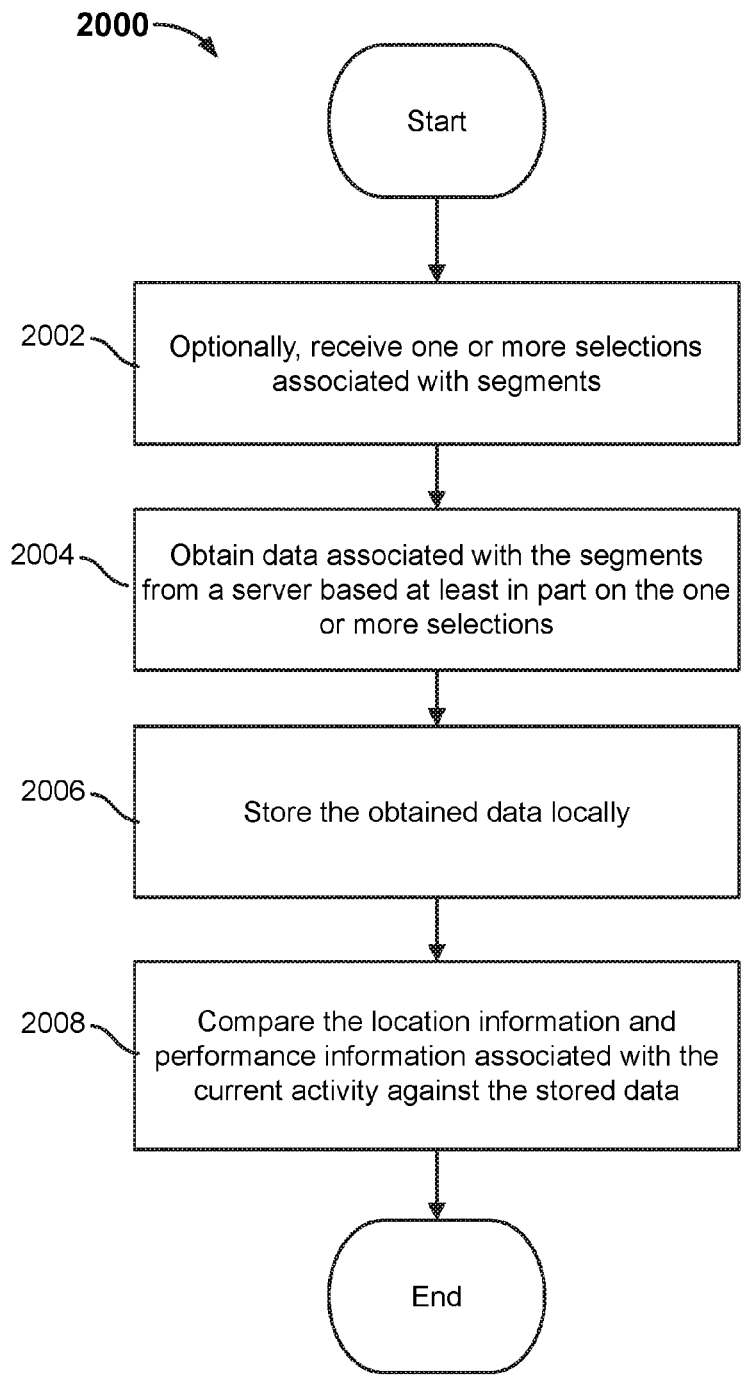
FIG. 20 is a flow diagram showing an embodiment of a process for pre-fetching segment data from the server and generating real-time feedback at the device in accordance with some embodiments.

FIG. 20 is a flow diagram showing an embodiment of a process for pre-fetching segment data from the server and generating real-time feedback at the device in accordance with some embodiments. In some embodiments, process 2000 is implemented at system 1500.

Process 2000 can be used to determine which data to pre-fetch from a segment matching server such as segment matching server 1508 prior to the start of a user's physical activity and to store such data on the device so that real-time feedback can be generated locally at the device later, during a user's physical activity. In some embodiments, process 2000 would require the use of a networked connection during a user's physical activity so that the GPS data of the activity can be determined, however, process 2000 may not require the repeated transmission of recorded GPS data and other data to the remote segment matching server because analysis for generating feedback data can be performed locally using the data pre-fetched from the segment matching server. In some embodiments, process 2000 may consume battery life slower and provide feedback data faster than a process that requires numerous communications back and forth with a remote segment matching server.

At 2002, optionally, one or more selections associated with segments are received. In some embodiments, such selections can be input by a user at a user interface associated with the device. In some embodiments, 2002 gives the user the opportunity to choose only the segments to which the user is interested in matching prior to the user engaging in a physical activity (or perhaps, in preparation of the user going on a physical activity). So, the selections associated with segments received at 2002 can be used to determine data with only those segments as opposed all segments for which data is stored.

In some embodiments, such as one or more selections can also be associated with segments that are of interest to the user to be detected when a user is in proximity to (e.g., within a designated proximity such as within a 10 miles radius of) them while engaging in a physical activity. For example, the user can select segment data to pre-fetch from the segment matching server that are associated with segments that are of interest to the user such that the user would like to be informed of when he or she is nearby such segments during a physical activity. For example, later, when the user is engaging in a physical activity, the pre-fetched data loaded on the device from the segment matching server can be used to determine (e.g., periodically and/or every X number of miles that the user has traveled) whether the user's current activity matches a segment and/or whether there are any segments nearby the user's current location.

At 2004, data associated with the segments is obtained from a server based at least in part on the one or more selections. In some embodiments, data associated with the segments identified by the selections includes one or both of: historical performance data of efforts that were determined to match the segments and geographic information (e.g., a set of tiles or MBRs) that define each of the segments.

In some embodiments, additional segment data associated with segments other than only those identified by the one or more selections can be obtained. For example, data associated with segments that are determined to be similar to the segments of the selections can also be obtained.

At 2006, the obtained data is stored locally. The data that is obtained prior to the start of a user's physical activity can be stored in either temporary or persistent storage at the device, so that it can be used later, during a user's physical activity, so that the remote segment matching server will not be needed to determine a matching segment and/or any nearby segments for the user while he or she is currently performing a physical activity.

At 2008, the location information and performance information associated with the user's current activity are compared against the stored data. For example, at least a portion of the GPS data recorded for the user's current activity so far can be used to match a segment for which data, including the data that was pre-fetched from the segment matching server prior to the start of the user activity, is stored locally. Also, for example, the historical performance data of efforts that were determined to match a segment matched to the user's current activity can be used to compare against the performance data recorded for the user's current activity so far. In some embodiments, other determinations can be made using the location information and performance information associated with the user's current activity and the locally stored data. For example, whether any segments are nearby/proximate to the user's current location can be determined using the locally stored data.

Figure 21:
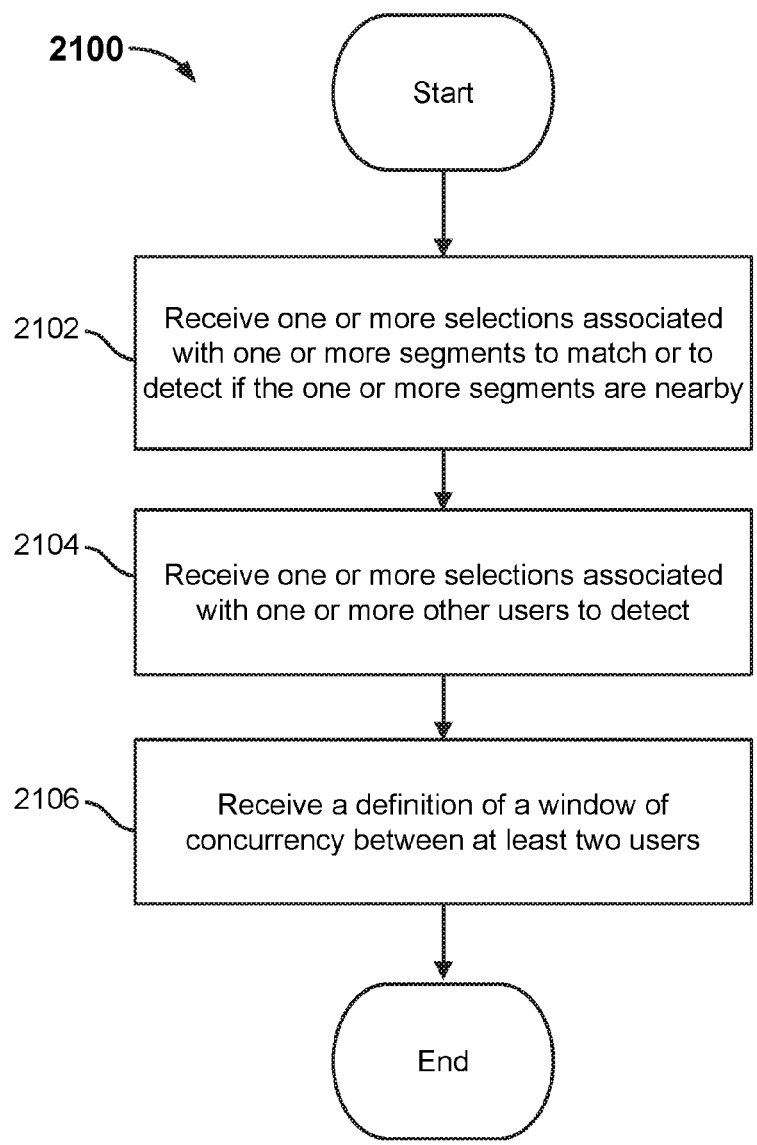
FIG. 21 is a flow diagram showing an embodiment of a process for configuring parameters associated with filters on data to obtain and to be compared against the performance data of the user's current activity.

FIG. 21 is a flow diagram showing an embodiment of a process for configuring parameters associated with filters on data to obtain and to be compared against the performance data of the user's current activity in accordance with some embodiments. In some embodiments, process 2100 is implemented at system 1500.

Process 2100 can be used to configure parameters that identify types of data that the user is interested in (e.g., to be obtained from a segment matching server such as segment matching server 1508 during a user's current activity), which can be used to filter out data that the user is not interested in. In some embodiments, the selections and definitions of process 2100 can be input by a user at a user interface associated with the device for example. In some embodiments, process 2100 is used to identify the subset of segments that a user is actually interested in potentially matching or detecting if they are nearby during a current activity (e.g., because the user could be traversing a geographic area that includes numerous segments, many of which the user is not interested in), the subset of performance data associated with other users (e.g., because the user could be interested in comparing his or her performance only against certain other users that he or she is friends with), and a user desired definition of window of concurrency between at least two users (e.g., because the user would like to compare his or her performance data against that of a "concurrent" user and would like to define the window of concurrency to include only those users that he or she feels that are temporarily or spatially close enough such that their performance data can be compared as concurrent users on the same segment). By configuring parameters that can act as filters such as those shown in the example, data can be retrieved from the segment matching server in a focused and efficient manner, without retrieving what could be a large amount of large data by a device, most of it potentially undesired by a user using the device.

At 2102, one or more selections associated with one or more segments to match or to detect if the segments are nearby are received. In some embodiments, the selections associated with segments can either be an identifier that corresponds with the name of the segment (e.g., "Old La Honda") or the selections can describe characteristics of one or more segments (e.g., length=30+ miles, difficulty=moderate, highest number of inclines within the segment=5). The selections can then be used to search for one or more segments that correspond to the descriptions included in the selections and the found segments will be the ones for which the recorded GPS data of a user's current activity will be compared against to determine if the user's current activity matches with or are otherwise nearby any one or more of the found segments. Put another way, only the segments that correspond to the selections will be used to determine if any one of them is the segment on which a user's current activity is taking place and/or is nearby to the user's current location.

At 2104, one or more selections associated with one or more other users to detect are received. In some embodiments, the selections associated with other users are used to determine at least which other users' performance data on a segment matched by the user's current activity against which the user potentially wishes to compare his or her performance data on the same segment. For example, user Barry may only want to compare his performance data against those of his friends. In some embodiments, the selections associated with other users determine which other users the user wishes to detect when the user is performing an activity. For example, user Barry can configure when to receive notifications regarding when his friend Carrie (who is also using an instance of a device such as device 1502) is also performing a physical activity in the vicinity, such as on the same segment or a nearby segment as Barry when Barry is out cycling. In some embodiments, selections associated with other users to detect include identifiers associated with the other users, such as, for example, the user's actual names or monikers that are associated with the user's accounts at the segment matching server. In some embodiments, selections associated with other users to detect include one or more physical characteristics such as, for example, an age range, a gender, and an associated experience level. For example, user Barry may want to detect users (with whom he may or may not already be friends) while he is out performing a physical activity with similar physical characteristics as him so that a comparison between his performance data with theirs can be determined during Barry's activity to give Barry an idea of his performance relative to similar individuals.

At 2106, a definition of a window of concurrency between at least two users is received. In some embodiments, the definition of a window of concurrency could be a temporal or distance window that would label two or more users within that window as being concurrent. For example, two users can be cycling along the same segment, but may have started at different times and as a result, are each at different points along the segment at a given time. However, a user may still wish to deem another user who is on the same segment as being concurrent to him or her, even though the two users did not start the segment at the same time and/or are not cycling side by side. So, for example, a user can define a window of concurrency as being 10 miles apart between two users or a difference of two minutes in start time between two users. That way, the user can potentially receive feedback data on another user who is currently on the same segment but had crossed the virtual start line of the segment 1 minute before the user did. The user can then be motivated to catch up or surpass the other concurrent user once he receives knowledge of this concurrent user.

Figure 22:
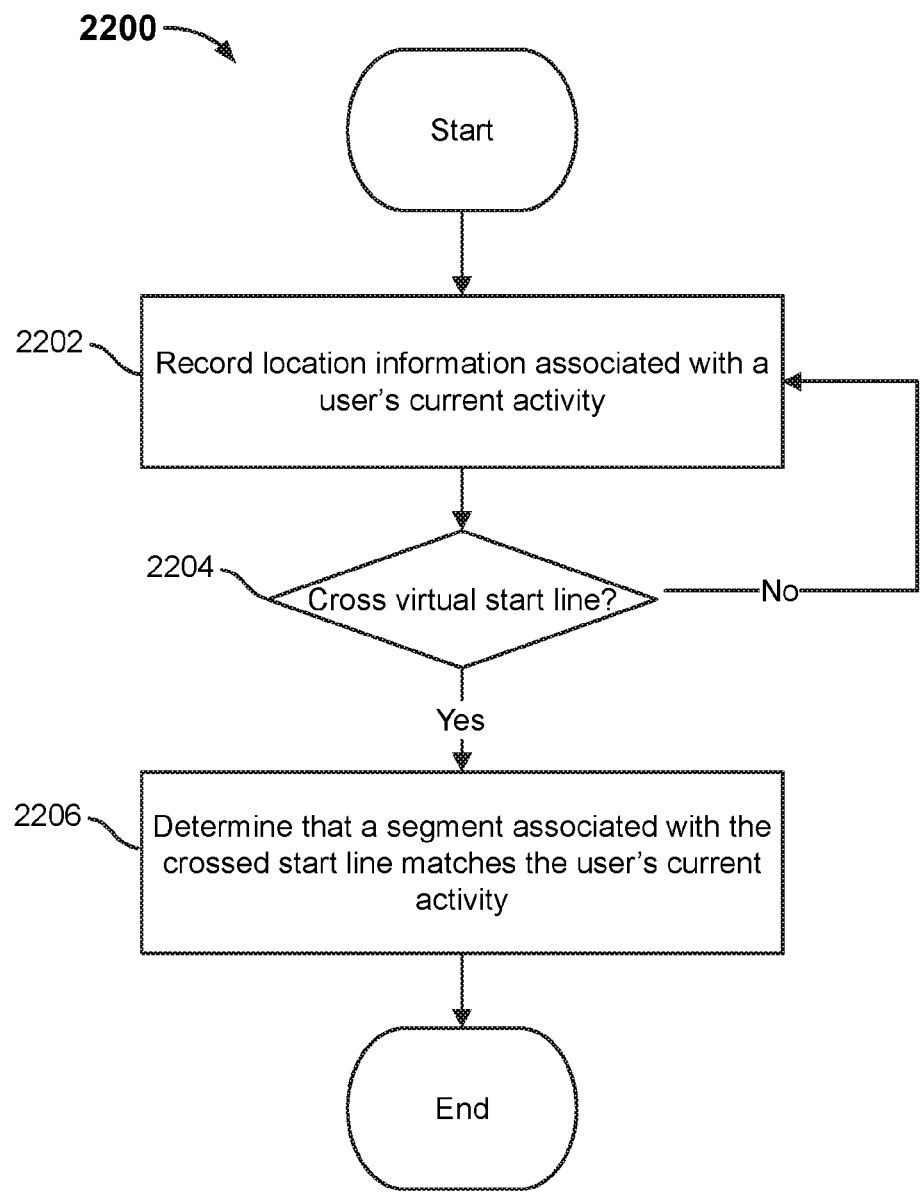
FIG. 22 is a flow diagram showing an embodiment of a process for matching a segment to a user's current activity in accordance with some embodiments.

FIG. 22 is a flow diagram showing an embodiment of a process for matching a segment to a user's current activity in accordance with some embodiments. In some embodiments, process 2200 is implemented at device 1502.

Process 2200 is one example of a technique for determining when a user has matched a segment (i.e., the user is performing the activity on a segment) during the user's current activity.

At 2202, location information associated with a user's current activity is recorded. In some embodiments, location information includes GPS data. In some embodiments, the location information of the user's current activity is recorded at a frequency configured by a user or by a default setting of a device such as device 1502 recording the information. In some embodiments, the recorded location information is sent to a remote segment matching server such at remote segment matching server 1508.

At 2204, it is determined whether a virtual start line of a segment has been crossed. In some embodiments, at least a portion of the location information recorded so far during the user's current activity is used to determine whether the geographic path of the activity has crossed a virtual start line defined for a stored segment. For example, the determination of whether a virtual start line has been crossed can be made based on the technique described with FIG. 12. In some embodiments, the determination of 2204 is made at the segment matching server. In some embodiments, the determination of 2204 is made at the device if segment data (e.g., sets of data that define segments and their virtual start lines) is stored locally at the device. In the event that it is determined that a virtual start line has been crossed, then control passes to 2206. In the event that it is determined that a virtual start line has not yet been crossed, then control passes back to 2202, where more location information associated with the user's current activity is recorded over time.

At 2206, a segment associated with the crossed start line is determined to match the user's current activity. In some embodiments, for the segment whose associated virtual start line that the location information of the user's current activity has been determined to cross, the user is assumed to be on that segment. In some embodiments, historical performance data associated with efforts that have been determined to match the segment and/or concurrent performance data of other users' current activities that have been determined to also match the segment are retrieved from the segment matching server or locally, if copies of such data are available locally at the device. The retrieved data can be used to provide one or more types of feedback data for the user including, for example, comparison results between the user's current performance data with the user's historical performance data on the matched segment and comparison results between the user's current performance data with other users' historical and/or concurrent performance data on the matched segment.

In some embodiments, where a stored segment forms a loop and does not have a virtual start line defined for it, neither 2204 nor 2206 may be performed to determine whether a user's current activity matches such a loop segment. Instead, in some embodiments, if the location information recorded for a user's current activity crosses at least a portion of a loop segment (which could indicate that the user has entered the loop), then it is determined that the user's current activity matches the loop segment matches.

Figure 23:
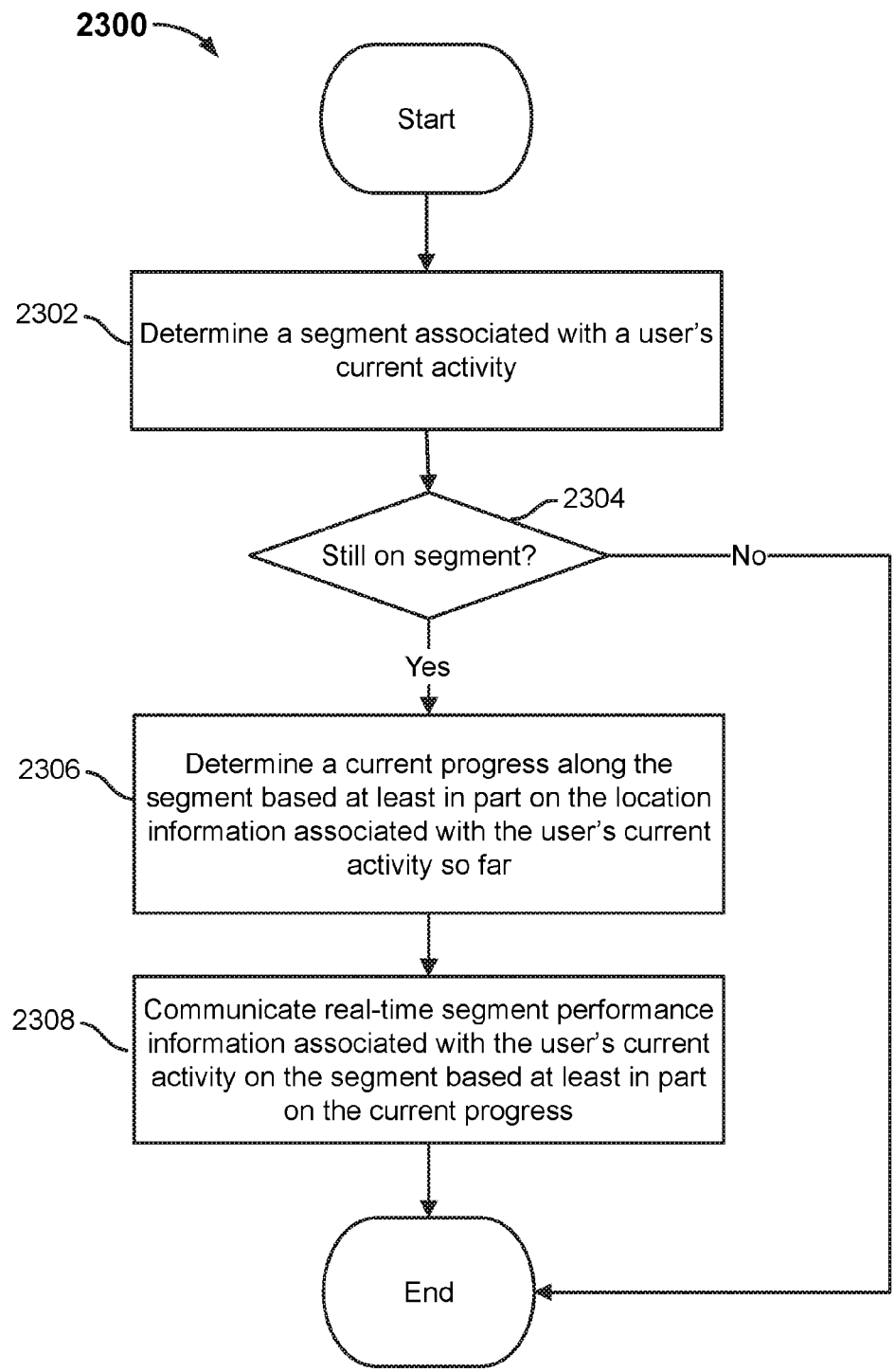
FIG. 23 is a flow diagram showing an embodiment of a process for determining a progress of a user along a segment in accordance with some embodiments.

FIG. 23 is a flow diagram showing an embodiment of a process for determining a progress of a user along a segment in accordance with some embodiments. In some embodiments, process 2300 is implemented at system 1500. In some embodiments, process 1800 is implemented using process 2300.

Process 2300 can be used after it is determined (e.g., by a process such as process 2200) that a user's current activity matches (i.e., is on) a segment. Process 2300 can be used to determine whether, (e.g., periodically) over time, the user's current activity is still traveling on the matched segment and if so, how far along the user is along the segment. In some embodiments, if it is determined that a user is still traveling on a matched segment, then feedback data is provided based at least in part on that determination.

At 2302, a segment associated with a user's current activity is determined. In some embodiments, the segment is determined as one that matches at least a portion of the location information recorded so far for the user's current activity using a process such as process 2200.

At 2304, it is determined whether the user is still on the segment. In some embodiments, 2304 is performed at a time sometime after a matched segment has been determined. In some embodiments, at 2304, the location information recorded so far for the user's current activity is compared to the data defining the matched segment (e.g., a set of MBRs) to determine whether the user's current activity still appears to be progressing along the segment or has deviated from the segment. For example, if the matched segment is represented as a stored set of MBRs, then the location information recorded so far for the user's current activity can also be converted in a set of MBRs. Then, if it appears that the MBRs associated with the location information recorded so far for the user's current activity mostly overlaps with at least a portion of the set of MBRs associated with the stored segment, then it is determined that the user's current activity is still on the segment. In some embodiments, the determination of 2304 is performed at a remote segment matching server such as segment matching server 1508 or at a device such as device 1502 if the segment data is stored locally at the device. In the event that it is determined that the user is no longer on the segment, then process 2300 ends. In the event that it is determined that the user is still on the segment, then control passes to 2306.

At 2306, a current progress along the segment is determined based at least on in part on the location information associated with the user's current activity so far. For example, a percentage of the set of MBRs associated with the stored segment that overlaps with the MBRs converted from the location information recorded so far for the user's current activity can be determined and this percentage be determined as the current progress of the user along the segment.

At 2308, real-time segment performance information associated with the user's current activity on the segment based at least in part on the current progress is communicated. In some embodiments, 2308 is optionally performed. In some embodiments, the performance information feedback data that is determined based at least in part on the determined current progress of the user on the segment is communicated. For example, the configured parameters can be used to determine at which instances a current progress is desired to be communicated to the user. An example instance is when the user is at a half way point of a segment, at which some performance information (e.g., determined based on comparisons of performance data) is communicated to the user. For example, a communication of such feedback data to the user can appear as a display and/or an audio output at the device that expresses that "You just passed the halfway point of Old La Honda and you're also 11 seconds ahead of your personal record pace."

Figure 24:
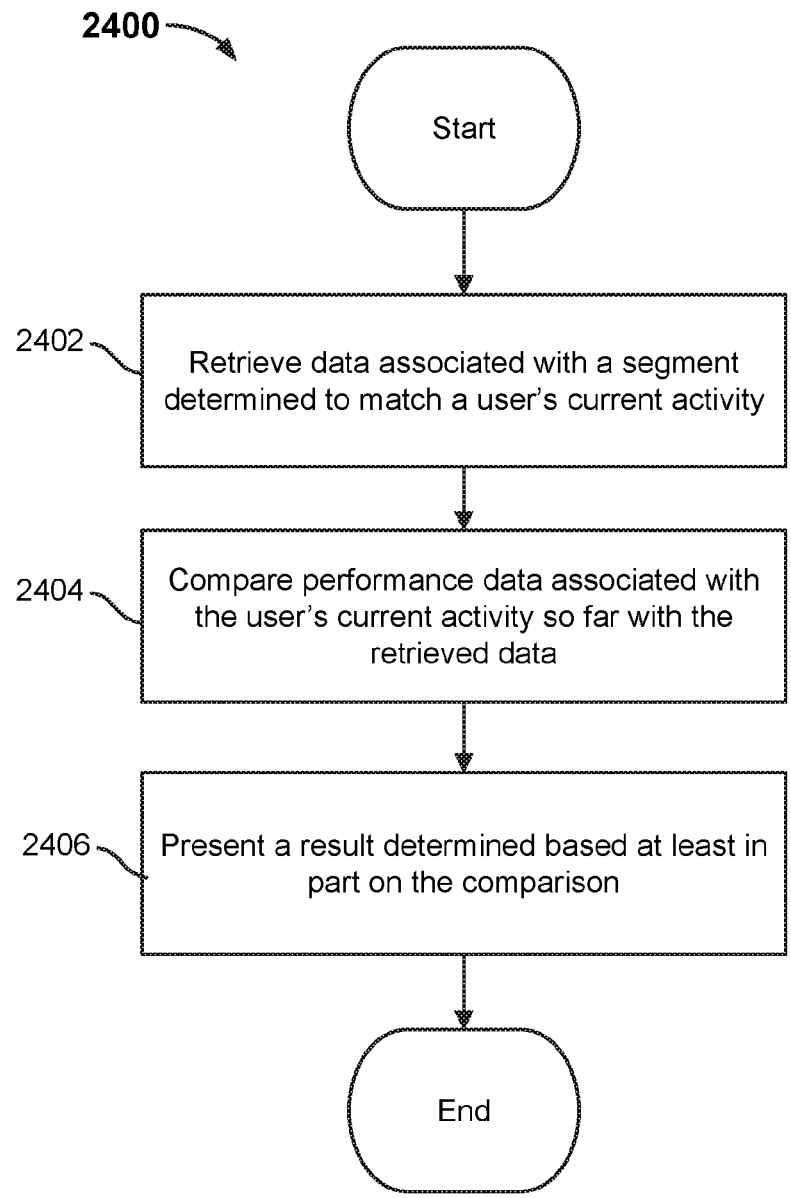
FIG. 24 is a flow diagram that shows an embodiment of a process for communicating real-time performance information associated with a user's current activity in accordance with some embodiments.

FIG. 24 is a flow diagram that shows an embodiment of a process for communicating real-time performance information associated with a user's current activity in accordance with some embodiments. In some embodiments, process 2400 is performed at system 1500. In some embodiments, 1804 of process 1800 is implemented using process 2400.

Process 2400 can be used as one example of determining the type of real-time feedback that is provided to a user during the user's current activity.

At 2402, data associated with a segment determined to match a user's current activity is retrieved. In some embodiments, it has already been determined that the user's current activity matches a segment (e.g., based on the location information recorded so far for the user's current activity). In some embodiments, historical performance data associated with efforts that have been determined to match the segment and/or concurrent performance data of other users' current activities that have been determined to also match the segment are retrieved from a remote segment matching server such as segment matching server 1508.

At 2404, performance data associated with the user's current activity so far is compared with the retrieved data. In some embodiments, the performance data portion of the associated data recorded by a device such as device 1502 for the user's current activity is compared against the retrieved data. Various types of comparisons of the data can be determined. In some embodiments, the types of comparisons to be made are dictated by a retrieved set of configured parameters. For example, the performance data associated with the user's current activity on the segment can be compared with the user's own historical performance data on the same segment (e.g., from previously matched efforts of the user's). Also for example, the performance data associated with the user's current activity on the segment can be compared with the historical performance data of other users' on the same segment (e.g., from previously matched efforts of the those other users). In another example, the performance data associated with the user's current activity on the segment can be compared with the performance data of other users who are concurrently on the same segment.

At 2406, a result determined based at least in part on the comparison is presented. For example, the comparison results can be presented to the user at a user interface of the device through one or more of graphics, text, video, and audio.

Below are some examples of real-time feedback data that can be determined and presented at a device such as device 1502 while a user is still performing an activity or soon after the user has completed the activity.

Examples of feedback data determined based on extrapolating the future performance of the user based on the recorded performance data associated with the user's current activity on a segment so far include:

"You're 34 miles into the 80 Paradise Loop route. At your current pace, you'll finish in 2:15 hours, at a time of 4:30 pm."

"You're about halfway into the Paradise Loop route. At your overall average pace, you should finish 45 minutes."

"You're about halfway into the Paradise Loop route. At your current average pace, you should finish 35 minutes."

"You're about halfway into the Paradise Loop route. The average rider finishes the ride in 45 minutes."

Examples of feedback data determined based on comparing the performance data associated with the user's current activity on a segment to the user's historical performance data on the same segment include:

"You set a new personal record on Old La Honda by 22 seconds."

"You rode your $3^{rd}$ best time on Old La Honda, 13 seconds behind your personal record set 1 month ago."

"You are currently at the halfway point of Old La Honda and you're 11 seconds ahead of your personal record pace."

"You are currently at the halfway point of Old La Honda and you're 7 seconds behind your personal recorded pace."

Examples of feedback data determined based on comparing the performance data associated with the user's current activity on a segment to the historical or concurrent performance data of other users on the same segment include:

"You set a new record on Old La Honda, 22 seconds ahead of Mark Shaw's previous record." In this example, the data associated with Mark Shaw is historical and not concurrent with the user's current activity on Old La Honda.

Figure 25:
FIG. 25 is a diagram showing a user interface screenshot of a leader board associated with the completed efforts on the "Marincello Trail" segment in accordance with some embodiments.

"You moved into $28^{th}$ place on Old La Honda, 15 seconds behind Aaron Foster in $27^{th}$ place." FIG. 25 is a diagram showing a user interface screenshot of a leader board associated with the completed efforts on the "Marincello Trail" segment in accordance with some embodiments. The example screenshot is associated with an application at a smart phone device. As shown in the screenshot, various users (Christian Hobbs, Aaron Foster, Mark Shaw, Jane Mitchell, and Rich Adams) that have completed the segment are ranked in the leader board based on their respective segment completion times. In the example, the current user Mark Shaw who has just completed an activity on the segment is to be ranked after the $27^{th}$ place holder of Aaron Foster in the leader board.

"Current Leader Board standings: $1^{st}$ Mark S. $2^{nd}$ Chris D., and $3^{rd}$ John D.; you are currently in $17^{th}$ place and 4 minutes and 30 seconds behind the leader." As indicated in this example, a leader board can be determined for the user and concurrent other users on the same segment as the user while the user is still performing a physical activity (as opposed to determining a leader board for the user only after the user has completed a physical activity).

"You're currently 13 seconds ahead of Mark Shaw, who's 300 meters behind you." In this example, the data associated with Mark Shaw is concurrent because Mark Shaw is also performing an activity on the same segment as the user's current activity.

"You're currently 13 seconds behind Mark Shaw, who's 300 meters behind of you."

"Mark is 1.0 miles away, he just finished Alpine Dam climb. If you both stay on the Alpine Dam Mt. Tam Loop route, you'll catch up with him in 30 minutes at your current pace."

"On the Paradise Loop route, 2 riders are ahead of you on the road: Mark S. by 30 seconds, Chris D. by 45 seconds. 1 rider is behind you: Pan T. at 5 minutes."

Examples of feedback data that comprise detected nearby segments (e.g., segments that the user is not currently on but are close by) based on comparing the location information data associated with the user's current activity to stored segment data include:

"Mark Shaw is 5.0 miles away. He looks to be about halfway through the Paradise Loop route. He's already ridden 16 miles today."

"It looks like you discovered a new category 2 climb, with a distance of 1.5 miles and an elevation gain of 1500 ft. Would you like to save this climb and name it?"

Figure 26:
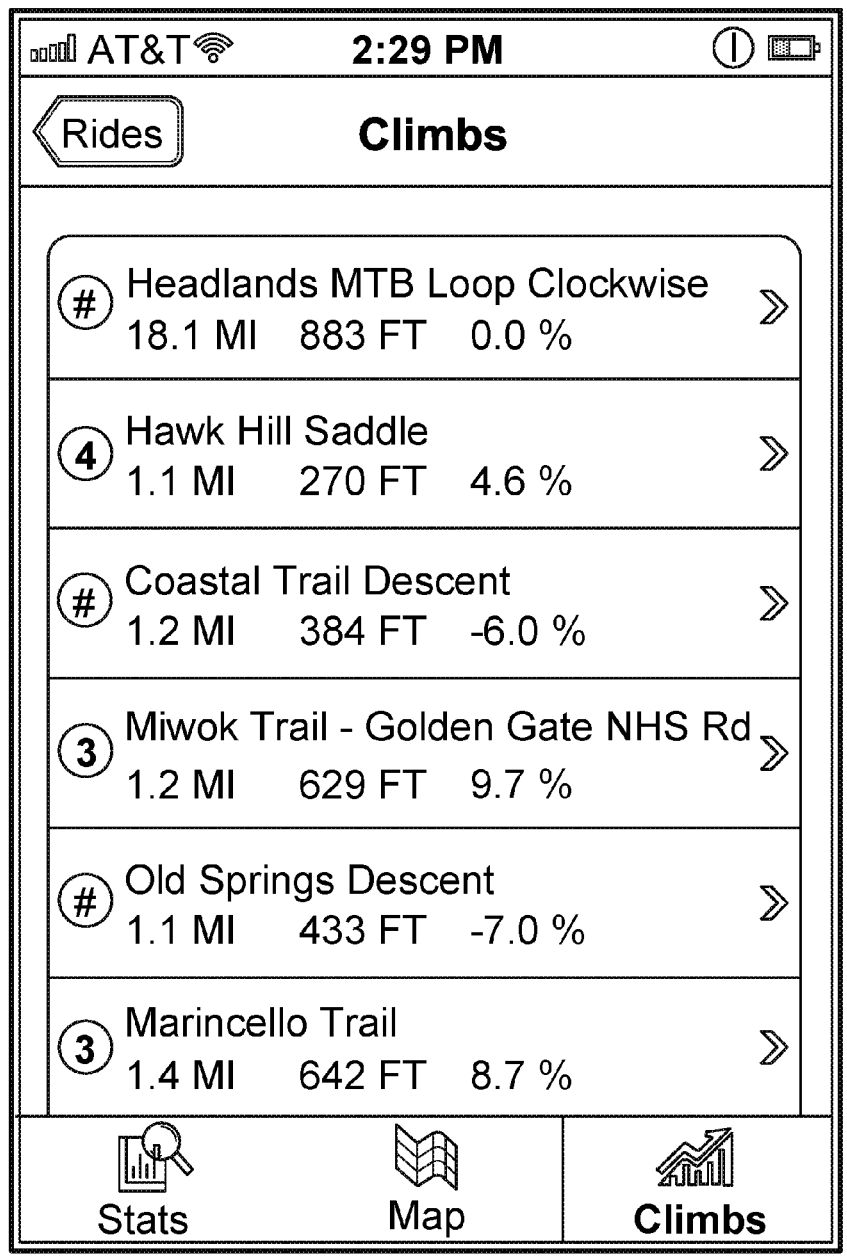
FIG. 26 is a diagram showing a user interface screenshot of a list of detected segments ("climbs") that are proximate to the user's current location in accordance with some embodiments.

FIG. 26 is a diagram showing a user interface screenshot of a list of detected segments ("climbs") that are proximate to the user's current location in accordance with some embodiments. The example screenshot is associated with an application at a smart phone. As shown in the example, each entry in the list of nearby segments is listed with some of the segment's physical descriptions.

Figure 27:
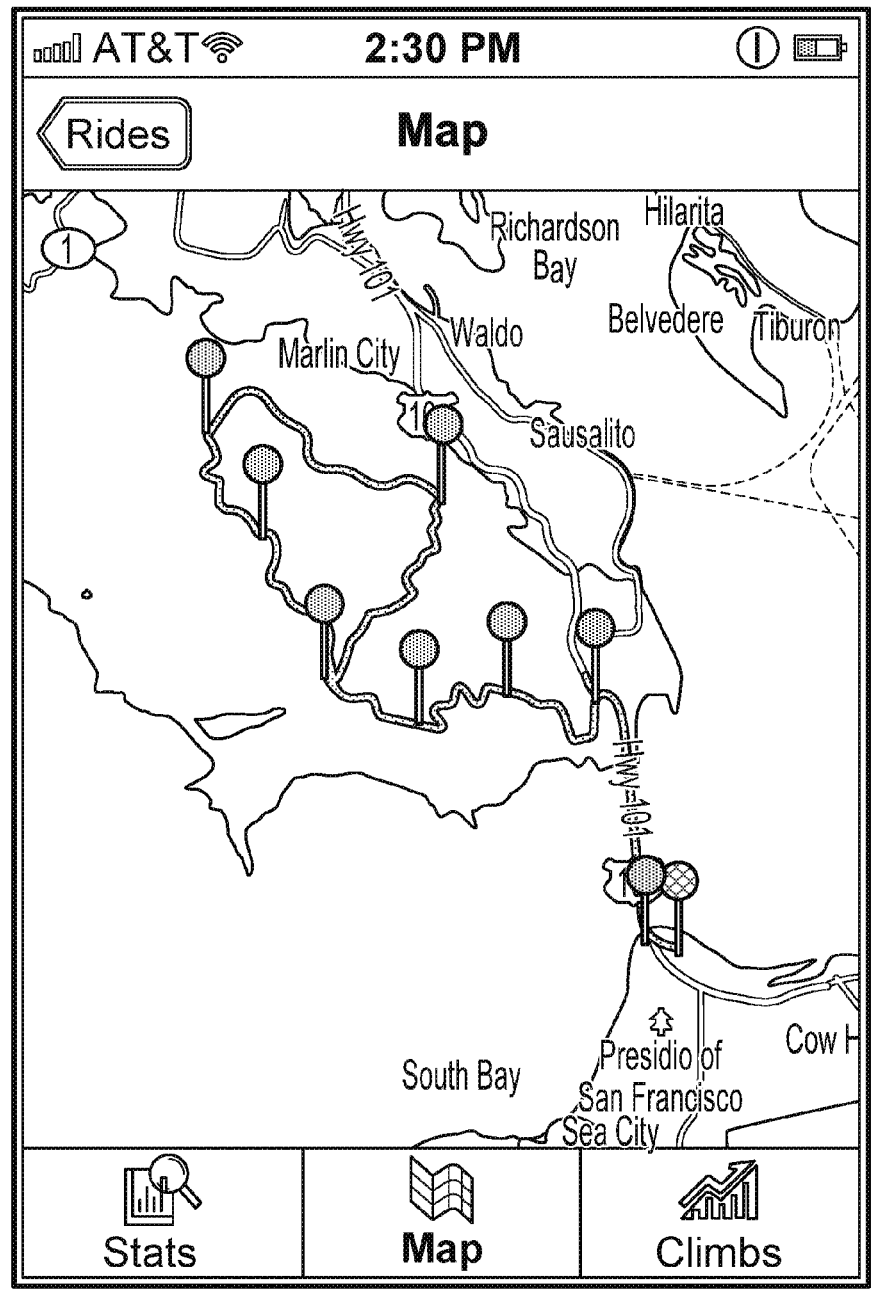
FIG. 27 is a diagram showing a user interface screenshot of a map of detected segments ("climbs") that are proximate to the user's current location in accordance with some embodiments.

FIG. 27 is a diagram showing a user interface screenshot of a map of detected segments ("climbs") that are proximate to the user's current location in accordance with some embodiments. The example screenshot is associated with an application at a smart phone. In the example, the purple pins indicate where each detected segment begins.

An example of feedback data that comprises sending alerts to a detected nearby other user is as follows:

"Mark Shaw is 1.0 miles away. He just finished the Alpine Dam climb. If you both stay on the Alpine Dam Mt. Tam Loop route, you'll catch up with him in 30 minutes at your current pace. Would you like to send him an alert to wait?"

Examples of feedback data that comprise indications regarding meeting up with nearby users include:

"Mark S. and Chris D. are waiting for your 10 minutes ahead at the start of the Paradise Loop route."

"Riders within your Favorites Riding Group are on your current segment and about 5 minutes behind you."

An example of feedback data that comprise sending a challenge to a detected nearby other user is as follows:

"Mark S. is 1.0 mile away. Would you like to challenge him to a duel on Old La Honda? His personal best is 22 seconds better than your own. Good luck!"

Examples of feedback data that comprise indications of the user's personal achievements include:

"You just rode your 100th mile this week, congratulations!"

"You just rode your 200th mile this month, congratulations!"

In some embodiments, parameters configured for a user or device can determine which feedback data provided for the user should be shared at one or more social networks (e.g., Facebook). For example, parameters configured prior to the user starting a physical activity can indicate that, during a user's physical activity, if a user is currently at the first position of a leader board for a segment, to post the story to the user's Facebook's wall. For example, to communicate with a third party server such as one that supports the Facebook platform, a segment matching server such as segment matching server 1508 can communicate with the Facebook server using appropriate APIs and authentication information. Once a story is shared at a social network, then friends or other users at the social network can make a selection with respect to the story (i.e., give the user a virtual kudos), which in turn may be sent to the device of the user to inform him of the other user's selection at the social network, for example.

In some embodiments, parameters configured for a user can determine whether real-time progress of the user's current activity can be viewed by other user(s) and if so, which other users. For example, at a website associated with the segment matching server and/or with a third party server such as one that supports a social network, a visual representation of the user's current activity can be presented and updated as the user progresses further along a segment to which the activity had matched. The visual representation can include markers along a graphical map and/or other data associated with the user's performance data on the segment. For example, prior to starting a physical activity, a user can configure parameters to indicate that he or she would like to share his or her real-time progress along a matched segment during an activity and also, who would be able to view the progress. For example, the user can give only certain other users (e.g., the user's friends at a social network) permission to view his or her progress during an activity or the user can select to allow any other users to view his or her progress. In some embodiments, the other users who have permission to view the user's real-time progress along a segment can do so by accessing an appropriate website (e.g., associated with the segment matching server and/or a social network) using a device (e.g., a mobile device or a desktop computer) while the user's activity is still ongoing. In some embodiments, the viewing users can also make a selection with respect to the user's real-time progress (i.e., give the user a virtual kudos), which in turn may be sent to the device of the user to inform him or her of the other user's selection at the website, for example.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing real-time segment performance information, comprising:
   storing a user configured definition for a window of concurrency on a segment, wherein the window of concurrency on the segment is defined based at least in part on a threshold time value or a threshold distance value, wherein the user configured definition for the window of concurrency comprises a condition for determining that at least two users comprise concurrent users with respect to one another on the segment, wherein the condition comprises a window within which at least two users currently performing activities that match the segment comprise concurrent users with respect to one another on the segment;
   determining, without user intervention, a first user's current activity that matches the segment based at least in part on at least a portion of location information recorded for the first user, wherein determining that the segment matches the first user's current activity includes determining that the at least portion of location information recorded for the first user matches at least a portion of a set of geographic information associated with the segment;
   determining, without user intervention, a second user's current activity that matches the segment based at least in part on at least a portion of location information recorded for the second user;
   determining, using a processor, whether the second user comprises a concurrent user with respect to the first user on the segment based at least in part on:
      determining a progress difference between the first user's current activity and the second user's current activity based at least in part on comparing the at least portion of location information recorded for the first user and the at least portion of location information recorded for the second user; and
      comparing the progress difference to the stored user configured definition for the window of concurrency on the segment; and
   communicating real-time segment performance information associated with the first user's current activity on the segment based at least in part on the determination of whether the second user comprises the concurrent user with respect to the first user on the segment, wherein the second user is currently active on the segment.

2. The method of claim 1, wherein determining that the first user's current activity matches the segment includes determining that the at least portion of location information recorded for the first user crosses a virtual start line associated with the segment.

3. The method of claim 1, wherein determining whether the first user's current activity matches the segment includes determining whether the at least portion of location information recorded for the first user crosses a portion associated with the segment.

4. The method of claim 1, wherein the location information recorded for the first user includes global positioning system (GPS) points and an associated timestamp at each GPS point.

5. The method of claim 1, further comprising receiving user-configurable selections associated with transmission of data by a device including one or more of the following: receiving one or more trigger event definitions, receiving a time period definition, and receiving one or more definitions associated with battery life conservation.

6. The method of claim 1, wherein communicating real-time segment performance information is based at least in part on feedback data sent to a device.

7. The method of claim 1, wherein communicating real-time segment performance information is based at least in part on feedback data generated at a device.

8. The method of claim 1, wherein the segment is associated with a user selection of segments to potentially match.

9. The method of claim 1, further comprising:
   obtaining data associated with one or more segments to potentially match to a device, wherein the obtained segment data is to be stored locally at the device, and wherein the at least portion of the location information recorded for the first user and other data associated with the first user's current activity are to be compared at the device to the locally stored data.

10. The method of claim 1, wherein the performance information includes: comparison results between performance data associated with the first user's current activity on the segment and stored historical performance data associated with the segment.

11. The method of claim 10, wherein the stored historical performance data includes data associated with one or both of the first user and another user.

12. The method of claim 1, wherein the performance information includes: comparison results between performance data associated with the first user's current activity on the segment and stored concurrent performance data associated with other users' current activities on the segment.

13. The method of claim 1, further comprising receiving user configurable selections associated with one or more other users whose performance data is to be compared with performance data associated with the first user's current activity.

14. The method of claim 1, further comprising sending at least a portion of the performance information recorded for the first user to a third party operated social network.

15. The method of claim 14, further comprising receiving a response from the third party operated social network based at least in part on the at least sent portion of the performance information.

16. The method of claim 1, further comprising determining a current progress associated with the first user's current activity on the segment based at least in part on the at least portion of the performance information recorded for the first user.

17. The method of claim 1, further comprising determining whether another segment is nearby a current location of the first user's current activity.

18. The method of claim 1, wherein the user configured definition for the window of concurrency on the segment is received from the first user.

19. The method of claim 1, wherein in the event that the second user comprises the concurrent user with respect to the first user, further comprising determining the real-time segment performance information based at least in part on comparing performance data associated with the first user's current activity on the segment to performance data associated with the second user's current activity on the segment.

20. The method of claim 1, further comprising:
receiving configurable selections associated with one or more other users whose current activity is to be compared with the first user's current activity; and
determining that the one or more other users comprise the second user.

21. The method of claim 1, wherein the first user and the second user did not start the segment at a same time, and wherein the second user is currently performing a physical activity on the segment and is currently within the threshold distance value or within the threshold time value of the first user on the segment.

22. The method of claim 1, wherein the progress difference between the first user's current activity and the second user's current activity on the segment is within the threshold distance value or within the threshold time value.

23. A system for providing real-time segment performance information, comprising:
a processor configured to:
store a user configured definition for a window of concurrency on a segment, wherein the window of concurrency on the segment is defined based at least in part on a threshold time value or a threshold distance value, wherein the user configured definition for the window of concurrency comprises a condition for determining that at least two users comprise concurrent users with respect to one another on the segment, wherein the condition comprises a window within which at least two users currently performing activities that match the segment comprise concurrent users with respect to one another on the segment;
determine, without user intervention, a first user's current activity that matches the segment based at least in part on at least a portion of location information recorded for the first user, wherein determining that the segment matches the first user's current activity includes determining that the at least portion of location information recorded for the first user matches at least a portion of a set of geographic information associated with the segment;
determine, without user intervention, a second user's current activity that matches the segment based at least in part on at least a portion of location information recorded for the second user;
determine whether the second user comprises a concurrent user with respect to the first user on the segment based at least in part on:
determining a progress difference between the first user's current activity and the second user's current activity based at least in part on comparing the at least portion of location information recorded for the first user and the at least portion of location information recorded for the second user; and
comparing the progress difference to the stored user configured definition for the window of concurrency on the segment; and
communicate real-time segment performance information associated with the first user's current activity on the segment based at least in part on the determination of whether the second user comprises the concurrent user with respect to the first user on the segment, wherein the second user is currently active on the segment; and
a memory coupled to the processor and configured to provide the processor with instructions.

24. The system of claim 23, wherein the processor is further configured to receive user-configurable selections associated with transmission of data by a device including one or more of the following: receiving one or more trigger event definitions, receiving a time period definition, and receiving one or more definitions associated with battery life conservation.

25. The system of claim 23, wherein to communicate real-time segment performance information is based at least in part on feedback data sent to a device.

26. The system of claim 23, wherein to communicate real-time segment performance information is based at least in part on feedback data generated at a device.

27. The system of claim 23, wherein the processor is further configured to:
obtain data associated with one or more segments to potentially match to a device, wherein the obtained segment data is to be stored locally at the device, and wherein the at least portion of the location information recorded for the first user and other data associated with the first user's current activity are to be compared at the device to the locally stored data.

28. The system of claim 23, wherein the performance information includes: comparison results between performance data associated with the first user's current activity on the segment and stored historical performance data associated with the segment.

29. The system of claim 23, wherein the performance information includes: comparison results between performance data associated with the first user's current activity on the segment and stored concurrent performance data associated with other users' current activities on the segment.

30. The system of claim 23, wherein the processor is further configured to receive user configurable selections associated with one or more other users whose performance data is to be compared with performance data associated with the first user's current activity.

31. A computer program product for providing real-time segment performance information, the computer program product being embodied in a non-transitory computer readable storage medium and comprising computer instructions for:

storing a user configured definition for a window of concurrency on a segment, wherein the window of concurrency on the segment is defined based at least in part on a threshold time value or a threshold distance value, wherein the user configured definition for the window of concurrency comprises a condition for determining that at least two users comprise concurrent users with respect to one another on the segment, wherein the condition comprises a window within which at least two users currently performing activities that match the segment comprise concurrent users with respect to one another on the segment;

determining, without user intervention, a first user's current activity that matches the segment based at least in part on at least a portion of location information recorded for the first user, wherein determining that the segment matches the first user's current activity includes determining that the at least portion of location information recorded for the first user matches at least a portion of a set of geographic information associated with the segment;

determining, without user intervention, a second user's current activity that matches the segment based at least in part on at least a portion of location information recorded for the second user;

determining whether the second user comprises a concurrent user with respect to the first user on the segment based at least in part on:

determining a progress difference between the first user's current activity and the second user's current activity based at least in part on comparing the at least portion of location information recorded for the first user and the at least portion of location information recorded for the second user; and comparing the progress difference to the stored user configured definition for the window of concurrency on the segment; and communicating real-time segment performance information associated with the first user's current activity on the segment based at least in part on the determination of whether the second user comprises the concurrent user with respect to the first user on the segment, wherein the second user is currently active on the segment.

\* \* \* \* \*

UNITED STATES PATENT AND TRADEMARK OFFICE
CERTIFICATE OF CORRECTION

PATENT NO. : 9,291,713 B2
APPLICATION NO. : 13/434435
DATED : March 22, 2016
INVENTOR(S) : Shaw et al.

Page 1 of 1

It is certified that error appears in the above-identified patent and that said Letters Patent is hereby corrected as shown below:

Title Page, Item 56, Other Publications, Citation 7, delete "Author Unknown, RouteBoxer Documentation: Examples, downloaded from http://google-maps-utilitylibrary-v3 googlecode.com/svn/trunk/routeboxer/docs/examples.html, document date Mar. 7, 2011, downloaded Aug. 2, 2011,(Example 8)."
and insert -- Author Unknown, RouteBoxer Documentation: Examples, downloaded from http://google-maps-utility-libraryv3. googlecode.com/svn/trunk/routeboxer/docs/examples.html, document date March 7, 2011, downloaded August 2, 2011,(Example 8). -- therefor.

Signed and Sealed this
Twelfth Day of July, 2016

Michelle K. Lee
*Director of the United States Patent and Trademark Office*